US010960783B2

(12) United States Patent
Boisen et al.

(10) Patent No.: US 10,960,783 B2
(45) Date of Patent: Mar. 30, 2021

(54) COMMUNICATION SYSTEMS AND METHODS FOR HYDROGEN FUELING AND ELECTRIC CHARGING

(71) Applicants: Nikola Corporation, Phoenix, AZ (US); Nel Hydrogen A/S, Herning (DK)

(72) Inventors: Jesper Nissen Boisen, Herning (DK); Livio Richard Gambone, Phoenix, AZ (US); Grigorij J. Grabovskij, Ammerbuch (DE); Jesse Michael Schneider, Chandler, AZ (US); Jacob Appelt Vibe Svendsen, Silkeborg (DK); Bjarne Vig, Galten (DK)

(73) Assignee: Nikola Corporation, Phoenix, AZ (US)

(*) Notice: Subject to any disclaimer, the term of this patent is extended or adjusted under 35 U.S.C. 154(b) by 0 days.

(21) Appl. No.: 16/929,816

(22) Filed: Jul. 15, 2020

(65) Prior Publication Data

US 2020/0346554 A1     Nov. 5, 2020

Related U.S. Application Data

(63) Continuation of application No. 16/875,612, filed on May 15, 2020, now Pat. No. 10,800,281, which is a (Continued)

(51) Int. Cl.
*B60L 53/66*     (2019.01)
*H04W 4/40*     (2018.01)
(Continued)

(52) U.S. Cl.
CPC ............... *B60L 53/66* (2019.02); *B60L 50/71* (2019.02); *B60S 5/02* (2013.01); *B67D 7/3218* (2013.01); *B67D 7/3281* (2013.01); *H04B 5/0031* (2013.01); *H04W 4/40* (2018.02); *H04W 76/10* (2018.02); *B60L 2240/36* (2013.01)

(58) Field of Classification Search
CPC combination set(s) only.
See application file for complete search history.

(56) References Cited

U.S. PATENT DOCUMENTS 8,924,037 B2    12/2014   Seymour et al.
9,180,783 B1 *   11/2015   Penilla .................... B60L 53/68
(Continued)

OTHER PUBLICATIONS

USPTO; Non-Final Office Action in the U.S. Appl. No. 16/875,612 dated Jul. 31, 2020.
(Continued)

*Primary Examiner* — Adam D Houston
(74) *Attorney, Agent, or Firm* — Snell & Wilmer L.L.P.

(57) ABSTRACT

Systems and methods for fueling (or charging) communication, for example between a hydrogen fueling station and a hydrogen powered vehicle (or an electric vehicle and charging station) may utilize near field communication as well as vehicle to infrastructure communication. Safety information, fueling or charging information, payment information, and other information may be transmitted, and the redundant nature of the communication permits fault recovery and improved process monitoring. In this manner, fueling and/or recharging is made safer, faster, and more efficient.

17 Claims, 10 Drawing Sheets

Related U.S. Application Data continuation of application No. PCT/US2020/018518, filed on Feb. 17, 2020.

(60) Provisional application No. 62/807,030, filed on Feb. 18, 2019.

(51) Int. Cl.
| | |
|---|---|
| *H04B 5/00* | (2006.01) |
| *H04W 76/10* | (2018.01) |
| *B60L 50/71* | (2019.01) |
| *B67D 7/32* | (2010.01) |
| *B60S 5/02* | (2006.01) |

(56) References Cited

U.S. PATENT DOCUMENTS

| | | | |
|---|---|---|---|
| 9,371,007 B1* | 6/2016 | Penilla | B60L 53/305 |
| 9,715,682 B2 | 7/2017 | Webb et al. | |
| 10,133,280 B2 | 11/2018 | Kim et al. | |
| 10,378,943 B2 | 8/2019 | Kim et al. | |
| 10,396,832 B2 | 8/2019 | Emori et al. | |
| 10,663,970 B2 | 5/2020 | Park et al. | |
| 2012/0197460 A1 | 8/2012 | Seymour et al. | |
| 2013/0110296 A1* | 5/2013 | Khoo | G06Q 10/1093 |
| | | | 700/286 |
| 2013/0139897 A1 | 6/2013 | Kim et al. | |
| 2013/0217409 A1* | 8/2013 | Bridges | B60L 53/68 |
| | | | 455/456.1 |
| 2013/0338820 A1* | 12/2013 | Corbett | B60L 53/35 |
| | | | 700/232 |
| 2013/0345888 A1* | 12/2013 | Forbes, Jr. | H04L 67/10 |
| | | | 700/291 |
| 2013/0346768 A1* | 12/2013 | Forbes, Jr. | H02J 3/46 |
| | | | 713/310 |
| 2014/0021908 A1* | 1/2014 | McCool | H02J 7/02 |
| | | | 320/108 |
| 2014/0089016 A1* | 3/2014 | Smullin | G06Q 10/02 |
| | | | 705/5 |
| 2014/0203077 A1* | 7/2014 | Gadh | H02J 13/00026 |
| | | | 235/382 |
| 2015/0143508 A1* | 5/2015 | Halibard | G06F 9/4406 |
| | | | 726/18 |
| 2016/0114686 A1* | 4/2016 | Beattie, Jr. | B60L 11/182 |
| | | | 320/108 |
| 2018/0062420 A1* | 3/2018 | Isaac | H01R 13/6205 |
| 2018/0075436 A1* | 3/2018 | Varvarezis | G06Q 20/327 |
| 2018/0106654 A1* | 4/2018 | Kim | G06Q 50/06 |
| 2018/0126861 A1* | 5/2018 | Dorndorfer | B60L 53/18 |
| 2018/0170202 A1* | 6/2018 | Kim | B60L 53/14 |
| 2018/0213376 A1 | 7/2018 | Pinheiro et al. | |
| 2018/0241228 A1* | 8/2018 | Kemppainen | H02J 7/0027 |
| 2018/0281612 A1* | 10/2018 | Perry | B60L 53/305 |
| 2018/0336024 A1* | 11/2018 | Klische | H04L 9/3247 |
| 2018/0339597 A1* | 11/2018 | Kruszelnicki | B60L 53/16 |
| 2018/0339601 A1* | 11/2018 | Kruszelnicki | B60L 53/18 |
| 2018/0361864 A1* | 12/2018 | Fremerman | B60L 11/1838 |
| 2019/0160950 A1* | 5/2019 | Roehrl | B60L 53/305 |
| 2019/0160957 A1* | 5/2019 | Hooker | B60L 53/68 |
| 2019/0275906 A1* | 9/2019 | Lin | H04B 5/0037 |
| 2019/0295189 A1* | 9/2019 | Strasser | G06Q 20/3224 |
| 2019/0299803 A1* | 10/2019 | Cheng | B60L 53/16 |
| 2019/0329666 A1* | 10/2019 | Kodama | B60L 3/00 |
| 2020/0074372 A1* | 3/2020 | Whaling | G06Q 10/06315 |
| 2020/0139840 A1* | 5/2020 | Roeder | H04W 12/00407 |
| 2020/0148068 A1* | 5/2020 | Melatti | B60L 53/60 |
| 2020/0156498 A1 | 5/2020 | Jun et al. | |
| 2020/0162487 A1* | 5/2020 | Hong | H04L 63/1416 |
| 2020/0189416 A1* | 6/2020 | Jung | B60L 53/16 |
| 2020/0223453 A1 | 7/2020 | Le Chaffotec | |
| 2020/0231051 A1* | 7/2020 | Krogh | B60L 53/65 |

OTHER PUBLICATIONS

USPTO; Notice of Allowance in the U.S. Appl. No. 16/875,612 dated Aug. 25, 2020.

PCT; International Search and Written Opinion in the PCT Application No. PCT/US2020/018518 dated Apr. 27, 2020.

\* cited by examiner

COMMUNICATION SYSTEMS AND METHODS FOR HYDROGEN FUELING AND ELECTRIC CHARGING

CROSS-REFERENCE TO RELATED APPLICATIONS

This application is a continuation of U.S. Ser. No. 16/875,612 filed May 15, 2020 and entitled "Communication Systems and Methods for Hydrogen Fueling and Electric Charging." U.S. Ser. No. 16/875,612 is a continuation of PCT Application No. PCT/US20/18518 filed Feb. 17, 2020 and entitled "Communication Systems and Methods for Hydrogen Fueling and Electric Charging." PCT Application No. PCT/US20/18518 claims priority to and the benefit of U.S. Provisional Application No. 62/807,030 filed on Feb. 18, 2019 and entitled "Communications Systems and Methods for Hydrogen Fueling and Electric Charging." The entirety of each of the foregoing applications are incorporated herein by reference for all purposes.

TECHNICAL FIELD

The present disclosure relates to fueling and charging systems and, more particularly, to communication systems and methods utilized in connection with fueling hydrogen-powered vehicles or charging of electric vehicles.

BACKGROUND

Typical approaches for fueling surface vehicles (e.g., automobiles) with gaseous hydrogen operate under safety standards set by SAE International, which standards include, for example SAE J2601 (Fueling Protocols for Light Duty Gaseous Hydrogen Surface Vehicles) and SAE J2799 (Hydrogen Surface Vehicle to Station Communications Hardware and Software). Under such standards, data concerning the fueling operation (e.g., temperature and pressure within and volume of a vehicle fuel tank) is typically provided to a hydrogen fueling station from a vehicle being fueled via a unidirectional communication approach utilizing an Infrared Data Association protocol (IrDA protocol). However, approaches using the IrDA protocol fail to satisfy meaningful risk classification levels on the station side under, for example, the Safety Integrity Level (SIL) or the Automotive Safety Integrity Level (ASIL) and should not, therefore, be relied upon in assessing risk for hydrogen fueling. Accordingly, improved communication systems and methods, for example for use in connection with fueling of hydrogen vehicles, remain desirable. Similarly, improved communication or safety approaches usable in connection with charging of electric vehicles remain desirable.

SUMMARY

In an exemplary embodiment, a method for communication between a hydrogen fueling station and a hydrogen powered vehicle comprises: disposing a nozzle of the station within a specified distance of a receptacle on the vehicle to establish, via first near field communication (NFC) hardware disposed proximate the nozzle and second NFC hardware disposed proximate the receptacle, an NFC link therebetween; communicating to the station, via the NFC link, identifying information for the vehicle; selecting, by the station, a vehicle to infrastructure (V2X) communication network based on the identifying information for the vehicle; establishing, between the station and the vehicle, a V2X communication link via the V2X communication network; and delivering through the nozzle, by the station and to the vehicle via the receptacle, pressurized hydrogen to at least partially fill a vehicle hydrogen tank.

In another exemplary embodiment, a method for communication between a hydrogen fueling station and a hydrogen powered vehicle comprises: disposing a nozzle of the station within a specified distance of a receptacle on the vehicle; communicating to the station, via first near field communication (NFC) hardware disposed proximate the nozzle and via second NFC hardware disposed proximate the receptacle, identifying information for the vehicle; and delivering through the nozzle, by the station and to the vehicle via the receptacle, pressurized hydrogen to at least partially fill a vehicle hydrogen tank.

In another exemplary embodiment, a hydrogen fueling station comprises: a hydrogen storage component; and a nozzle connected to the hydrogen storage component. The nozzle is connectable to a receptacle of a fuel cell vehicle, and the hydrogen fueling station is configured to fill a tank of the fuel cell vehicle with pressurized hydrogen gas via a flow path established by connecting the nozzle to the receptacle. First near field communication (NFC) hardware is disposed proximate the nozzle and second NFC hardware is disposed proximate the receptacle.

The first NFC hardware and the second NFC hardware are configured for communication of identifying information for the vehicle when the nozzle is within a specified distance of the receptacle, and the hydrogen fueling station is configured for controlling the delivery of pressurized hydrogen gas based on the identifying information.

The foregoing features and elements may be combined in any combination, without exclusivity, unless expressly indicated herein otherwise. These features and elements as well as the operation of the disclosed embodiments will become more apparent in light of the following description and accompanying drawings. The contents of this section are intended as a simplified introduction to the disclosure and are not intended to be used to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
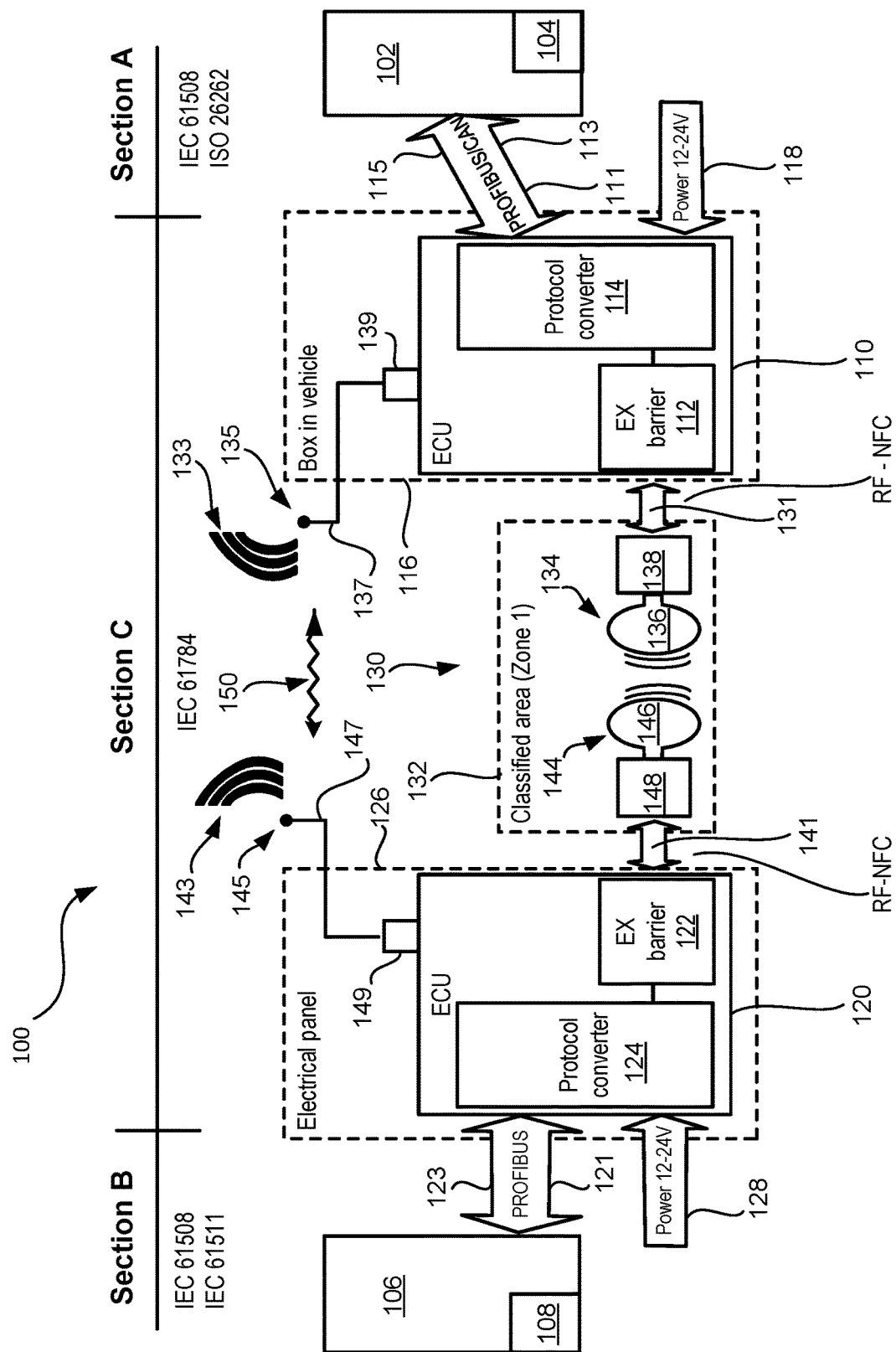
FIG. 1 illustrates an exemplary fueling or charging communication system, in accordance with various embodiments.

The following detailed description of various embodiments herein makes reference to the accompanying drawings, which show various embodiments by way of illustration. While these various embodiments are described in sufficient detail to enable those skilled in the art to practice the principles of the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

For the sake of brevity, conventional techniques for vehicle fueling or charging, communication between vehicles and stations, radio frequency (RF) communication, hydrogen transport and storage, electrical coupling, and/or the like may not be described in detail herein. Furthermore, the connecting lines shown in the various figures provided herein are intended to represent exemplary functional relationships, electrical connections or relationships, or physical or communicative couplings between various elements. It should be noted that many alternative or additional functional relationships or physical or communicative connections may be present in a practical system or related methods of use; for example, in connection with communication associated with fueling a hydrogen-powered vehicle or charging an electric vehicle.

Further, various shortcomings of prior hydrogen fueling systems and communication approaches may be addressed by utilizing systems and methods configured in accordance with the principles of the present disclosure. Additionally, various shortcomings of prior electric vehicle charging systems and communication approaches may be addressed by utilizing systems and methods configured in accordance with the principles of the present disclosure. For example, exemplary systems and methods disclosed herein may be employed to enable improved communication capabilities and related functionality in connection with fueling a hydrogen vehicle, for example a class 8 truck, a locomotive, a bus, or some other vehicle powered by a hydrogen fuel cell. Such improved communication capabilities may, among other things, increase fueling speed and safety.

With reference now to FIG. 1, a system 100 employing a two-stage communication hardware methodology and associated software and hardware components is disclosed. In various embodiments, system 100 enables bidirectional communication between a vehicle 102 having a vehicle safety system 104 and a station 106 having a station safety system 108 for fueling (e.g., gaseous and/or liquid hydrogen fueling) or for charging (e.g., electrical battery charging) as well as for general communication (e.g., financial payment, vehicle identification, personal identification, authorization, and/or the like) between vehicle 102 and the station 106. In various embodiments, communication between vehicle 102 and station 106 occurs via at least two communication systems. The first communication system includes a Vehicle to Infrastructure (V2I) system or a Vehicle to Network (V2N) system or the like, either or both of which may be referred to herein as a V2X ("Vehicle to Everything") system. V2X systems may comprise, for example, 4G (i.e., IMT-Advanced standard or the like), 5G (i.e., IMT-2020 standard, 5G New Radio standard, or the like), IEEE 802.11 (i.e., Wi-Fi or the like) or similar systems or protocols, whether existing or future developed. V2X systems typically comprise a communication methodology utilizable for multiple applications, including, for example, communication between vehicles and infrastructure (e.g., uploads or downloads of data or software), automated payment, truck platooning, remote navigation, flashing of vehicle components, remote health monitoring or diagnostics, and/or the like. The second communication system includes a Near Field Communication (NFC) system, which typically relies on a short-distance wireless communication system that, in various embodiments, may include encryption. As used herein, NFC includes methods and hardware compatible with, or utilizing principles similar to, those set forth in (i) ISO/IEC 18092/ECMA-340—Near Field Communication Interface and Protocol-1 (NFCIP-1), (ii) ISO/IEC 21481/ECMA-352—Near Field Communication Interface and Protocol-2 (NFCIP-2), and/or (iii) any other existing or future-developed radio frequency protocol and/or hardware intended for communication over a limited distance, for example 20 centimeters or less. NFC systems typically comprise a communication methodology, for example for contactless payment systems similar to those used in credit cards or electronic tickets, authorization or authentication, identification, access control, and/or the like. This combined V2X+NFC communication system, referred to herein as "V2XN," enables, among other things: increased safety during fueling or charging operations via a bidirectional communication system; higher overall safety ratings (e.g., SIL or ASIL ratings); redundancy in the event one of the communication systems fails during fueling or charging; downloading or uploading of large data files; improved vehicle security and privacy; improved fleet management; and/or the like. These and other advantages and benefits of the systems and methods disclosed herein are described in more detail below.

In various embodiments, system 100 includes a vehicle electronic control unit 110. Among other components, vehicle electronic control unit 110 may comprise or be connected with a vehicle EX (explosion protection) barrier 112 and a protocol converter 114 (i.e., a vehicle protocol converter). In various embodiments, a vehicle bus 111, such as, for example, a PROFIBUS 113 ("Process Field Bus") or a controller area network 115 ("CAN") may be used to connect vehicle safety system 104 to vehicle electronic control unit 110. However, any suitable coupling components, protocols, and/or techniques may be utilized. In various embodiments, data communication between vehicle bus 111 and vehicle safety system 104 (e.g., that portion of the system identified as "Section A" in FIG. 1) may be compatible with or otherwise conform to the principles or the protocols set forth in: (i) IEC standard 61508 entitled "Functional Safety of Electrical/Electronic/Programmable Electronic Safety-related Systems," (ii) the International Organization for Standardization (ISO) standard 26262, entitled "Road Vehicles—Functional Safety", or (iii) any similar in-process or future developed protocol or standard. Vehicle electronic control unit 110 may be housed within a box 116 configured to protect the electronic components within the vehicle electronic control unit 110 from the elements, e.g., dust, humidity, smog, or the like. A vehicle power supply 118 (e.g., a 12V, 24V, or other suitable voltage power supply) may be used to power vehicle electronic control unit 110.

With continued reference to FIG. 1, in various embodiments system 100 includes a station electronic control unit 120. Among other components, station electronic control unit 120 may comprise or be connected with a station EX barrier 122 and a protocol converter 124 (i.e., a station protocol converter). In various embodiments, a station bus 121, for example a PROFIBUS 123, may be used to connect station safety system 108 to station electronic control unit 120. However, any suitable coupling components and/or protocols may be utilized, as desired. In various embodiments, data communication between station bus 121 and station safety system 108 (e.g., that portion of the system identified as "Section B in FIG. 1) may be compatible with or otherwise conform to the principles or the protocols set forth in (i) the International Electrotechnical Commission (IEC) standard 61508, (ii) the IEC standard 61511 entitled "Functional Safety—Safety Instrumented Systems for the Process Industry Sector", or (iii) any similar in-process or future developed protocol or standard. Station electronic control unit 120 may be housed within a box 126 configured to protect the electronic components within the station electronic control unit 120 from the elements, e.g., dust, humidity, smog, or the like. A station power supply 128 (e.g., a 12V, 24V, or any suitable voltage DC power supply) may be used to power the station electronic control unit 120.

Still referring to FIG. 1, vehicle electronic control unit 110 and station electronic control unit 120 are configured to wirelessly communicate with each other over NFC link 130 within a classified area 132. As used herein, a "classified area" is generally defined as a protected area where the dangers of gaseous fueling are recognized and appropriate safety measures are implemented. In various embodiments, the NFC link 130 is enabled, on a vehicle 102 side, via a vehicle NFC transceiver 134, which may comprise a vehicle NFC antenna 136 and a vehicle NFC antenna amplifier 138, or any other suitable NFC component or components. NFC components of vehicle 102 may be located in a suitable location, for example on or in a door or covering of a vehicle fueling receptacle, on or in a receptacle housing, and/or the like. In various embodiments, the NFC link 130 is further enabled, on a station 106 side, via a station NFC transceiver 144, which may comprise a station NFC antenna 146 and a station NFC antenna amplifier 148, or any other suitable NFC component or components. Data to and from vehicle electronic control unit 110 is provided to NFC link 130 via a vehicle radio frequency signal 131, sent and/or received between vehicle electronic control unit 110 and vehicle NFC antenna amplifier 138. Similarly, data to and from station electronic control unit 120 is provided to the NFC link 130 via a station radio frequency signal 141, sent and/or received between station electronic control unit 120 and station NFC antenna amplifier 148. In this manner, NFC link 130 may comprise a portion of the Near Field Communication (NFC) system described above. Moreover, in various embodiments, data communication across NFC link 130 and between the vehicle safety system 104 and the station safety system 108 (e.g., that portion of the system identified as "Section C" in FIG. 1) may be compatible with or otherwise conform to the principles or the protocols set forth in (i) the IEC standard 61784, entitled "Industrial Communication Networks—Profiles", or (ii) any similar in-process or future developed protocol or standard.

With still further reference to FIG. 1, vehicle electronic control unit 110 and station electronic control unit 120 are also configured to wirelessly communicate with each other over a V2X link 150, which, in various embodiments, comprises a wireless link established between vehicle electronic control unit 110 and station electronic control unit 120 via, for example, a 4G link, a 5G link, or an 802.11 link as discussed hereinbelow. In various embodiments, V2X link 150 is enabled, on a vehicle 102 side, via a vehicle V2X transceiver 135, which may comprise a vehicle V2X antenna 137 and a vehicle V2X antenna amplifier 139, or other suitable V2X components. In various embodiments, V2X link 150 is further provided, on a station 106 side, via a station V2X transceiver 145, which may comprise a station V2X antenna 147 and a station V2X antenna amplifier 149, or other suitable V2X components. Data from vehicle electronic control unit 110 may be provided to station electronic control unit 120 via a vehicle wireless signal 133 sent via V2X link 150. Additionally, data from station electronic control unit 120 may be provided to vehicle electronic control unit 110 via a station wireless signal 143 sent via V2X link 150. In this manner, V2X link 150 may comprise a portion of the Vehicle-to-Infrastructure (V2I) system or the Vehicle-to-Network (V2N) system described above.

It will be appreciated that, while system 100 described above is broadly described to cover both gaseous fueling operations and electric charging operations, various of the components described above may not be utilized or necessary in an electronic charging operation. Such components may include, for example, vehicle EX barrier 112 and station EX barrier 122. Additionally, stringent safety measures within the classified area 132 may also be relaxed for embodiments of system 100 utilized for electric charging but not for gaseous fueling. Further details of an exemplary system 100 are now provided in the following description, with the focus being, however, on systems primarily dedicated to gaseous fueling operations.

Figure 2A:
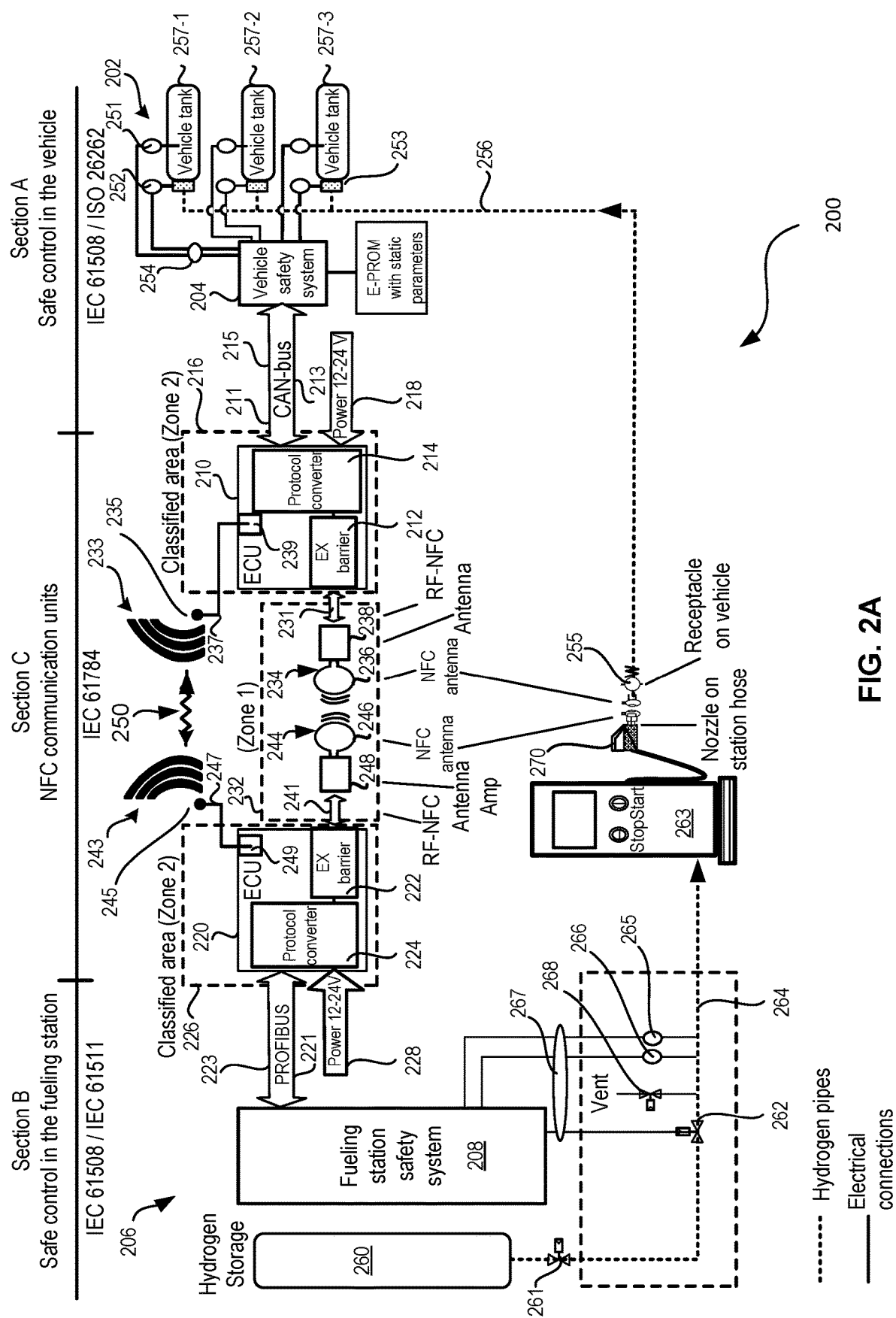
FIGS. 2A, 2B, and 2C illustrate an exemplary hydrogen fueling communication system, in accordance with an exemplary embodiment.
Figure 2B:
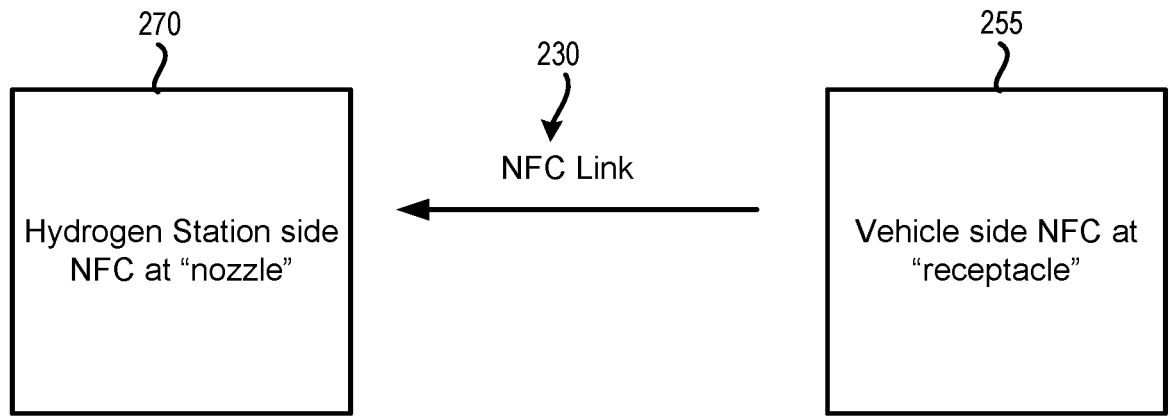
Figure 2C:
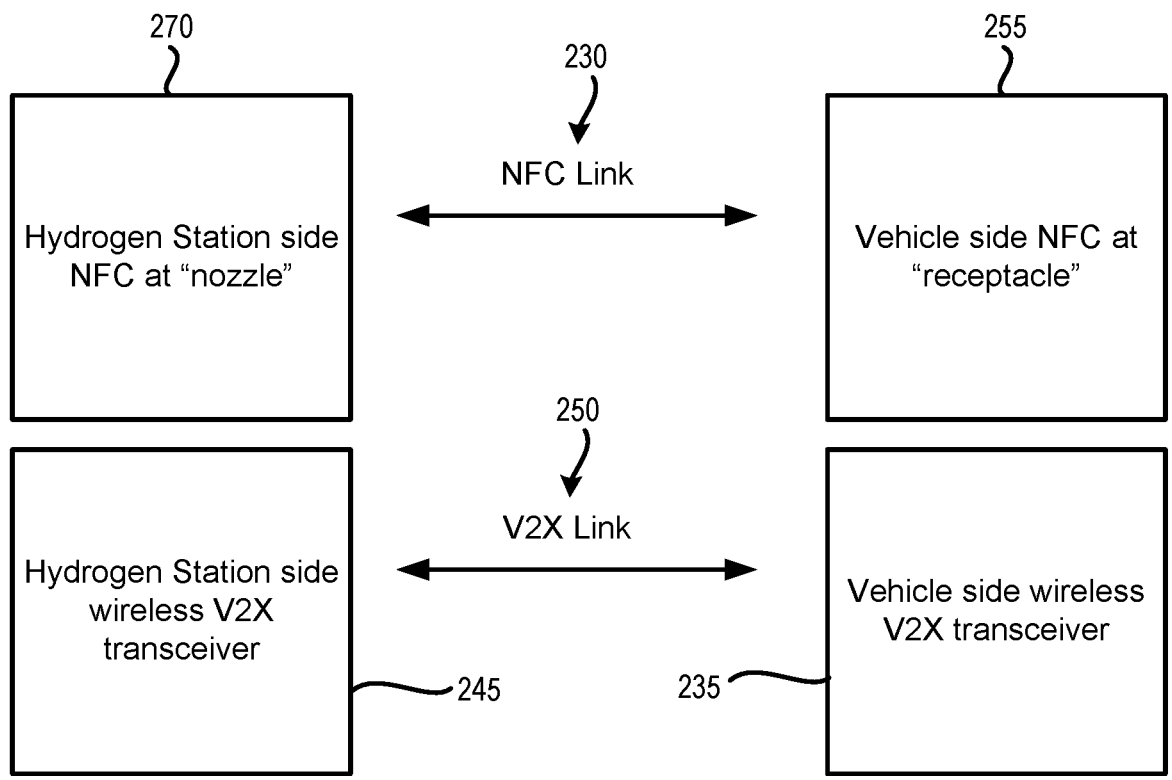

With reference now to FIGS. 2A, 2B and 2C, a system 200 employing a two-stage communication hardware methodology and associated software and/or hardware components is disclosed, with specific reference to a gaseous hydrogen fueling station and a vehicle undergoing a gaseous hydrogen fueling operation. In various embodiments, system 200 is similar to system 100 described above with reference to FIG. 1 and enables bidirectional communication between a vehicle 202 having a vehicle safety system 204 and a station 206 having a station safety system 208, for example for gaseous hydrogen fueling as well as for general communication (e.g., financial payment, vehicle identification, authentication, access control, and/or the like) between vehicle 202 and station 206. In addition to the components of system 100 described above with reference to FIG. 1, system 200 may include additional components comprising vehicle 202 and/or station 206. For example, vehicle 202 may include one or more vehicle tanks for storage of gaseous hydrogen, for example a first hydrogen storage tank 257-1, a second hydrogen storage tank 257-2, and a third hydrogen storage tank 257-3. Each of the one or more hydrogen storage tanks 257 may include a temperature sensor 251, a pressure sensor 252, and a master valve 253. Temperature sensor 251 and pressure sensor 252 may be connected to vehicle safety system 204 via one or more vehicle data buses 254 or other wired or wireless communication links. The master valve 253 on each tank 257 is connected to a receptacle 255 via a vehicle conduit 256, the vehicle conduit 256 configured to deliver gaseous hydrogen fuel from receptacle 255 to the master valve 253 on each of the tanks 257. Station 206, on the other hand, further includes a hydrogen storage tank 260 fluidly coupled to a nozzle 270 configured for removable engagement with the receptacle 255 on the vehicle 202. Intermediate the hydrogen storage tank 260 and the nozzle 270 may be disposed a flow rate control valve 261 downstream of the hydrogen storage tank 260, a cut-off valve 262, and a dispenser 263 (and/or an operator input device), each of which are fluidly coupled between hydrogen storage tank 260 and nozzle 270 via a station conduit 264. A pressure sensor 265, a temperature sensor 266, and a cut-off valve 262 may be configured to provide data reflecting hydrogen flow conditions within station conduit 264 to station safety system 208 via one or more station data buses 267 or other suitable wired or wireless links. Station safety system 208 may also include a vent 268 configured to release hydrogen gas from the station conduit 264, for example in response to an overpressure event, an unexpected depressurization, a command or protocol to flush or purge an area of hydrogen gas, and/or the like.

Similar to system 100 described above with reference to FIG. 1, in various embodiments system 200 includes a vehicle electronic control unit 210. Among other components, vehicle electronic control unit 210 may comprise or be connected with a vehicle EX barrier 212 and a protocol converter 214. In various embodiments, a vehicle bus 211, for example, a PROFIBUS 213 or a CAN 215 may be used to connect vehicle safety system 204 to vehicle electronic control unit 210. In various embodiments, data communication in that portion of the system identified as Section A in FIG. 2A may operate similarly to that portion of the system identified as Section A in FIG. 1. Vehicle electronic control unit 210, vehicle box 216, and vehicle power supply 218 may likewise correspond.

In various embodiments, system 200 includes a station electronic control unit 220 similar to unit 120 in FIG. 1 and having similar components thereto, and data communication in that portion of the system identified as Section B in FIG. 2A may operate similarly to that portion of the system identified as Section B in FIG. 1. Station box 226 and power supply 228 may likewise correspond. Moreover, continuing to reference FIG. 2A, components and protocols in that portion of the system identified as Section C may operate similarly to that portion of the system identified as Section C in FIG. 1.

Referring now to FIGS. 2B and 2C, and with continued reference to FIG. 2A, a data transfer or communication process during a fueling operation is described, in accordance with various embodiments. For data transfer from vehicle 202 to station 206 (and vice-versa), it is desirable to accurately identify vehicle 202 while located in proximity of station 206. In various embodiments, receptacle 255 communicates with nozzle 270 across NFC link 230. At this point, data concerning vehicle 202 may be transferred to station 206. For example, vehicle 202 may transmit one or more of a unique vehicle identification number (VIN), authentication information, encryption information, handshake information, token information, driver and/or passenger information, vehicle diagnostic information, and/or static information concerning tanks 257. The static information may include, for example: the volume of the one or more tanks 257 (e.g., 100 liters, 400 liters, 800 liters, 2100 liters, and/or the like); a pressure rating of one or more tanks 257; the tank 257 type (e.g., Type 1, 2, 3, 4, or the like); the number of tanks 257 (e.g., 1, 2, 3, 4, 8, 10, or more tanks); dimensional information for tanks 257 (e.g., length, diameter, wall thickness, etc.); materials used to construct tanks 257; a service date or dates for tanks 257; serial numbers of tanks 257; and/or other pertinent manufacturing, servicing, or use data for tanks 257. In various embodiments, NFC link 230 from vehicle 202 to station 206 typically satisfies SIL 2 on the station side and ASIL B/C on the vehicle side. In various embodiments, data communication across NFC link 230 is operative at 13.56 MHz on an ISO/IEC 18000-3 air interface and at rates ranging from 106 kbits/s to 424 kbit/s. However, any suitable frequency, data rate, transmission protocol, and/or the like may be utilized. Once initial data from vehicle 202 is provided to station 206, bidirectional links across NFC link 230 and V2X link 250 may be established. For example, the initial data from vehicle 202 may specify a list of compatible protocols, identifying addresses or identifiers (i.e., IP addresses, media access control (MAC) addresses, and/or the like), and/or networks that may be utilized for V2X link 250. Station 206 may evaluate the options for initiating and/or selecting V2X link 250 and direct communication to vehicle 202 thereby, for example based on an estimated or theoretical maximum speed of data transmission, network congestion, applicable security protocol, and/or the like. Moreover, network and/or other information for V2X link 250 may be stored in station 206 and utilized responsive to establishment of NFC link 230; stated another way, vehicle 202 and station 206 may have agreed in advance and/or otherwise defined a suitable approach for establishment of and communication over V2X link 250 (for example, communication via a common software application that are routed over a global packet-switched network such as the internet).

Alternatively, station 206 may provide initial data to vehicle 202 via NFC link 230; moreover, initial data to and/or from vehicle 202 and/or station 206 may be transferred via V2X link 250 prior to data being transmitted across NFC link 230 (for example, data may be transferred as vehicle 202 approaches station 206 but prior to vehicle 202 reaching station 206). In this manner, improved fueling process flows may be achieved, for example by directing vehicle 202 to approach a particular fueling location best suited to fuel vehicle 202 (for example, due to station space constraints, fueling spot availability or queue management, anticipated fueling demands from vehicle(s) ahead of and/or behind vehicle 202, estimated or measured data rates between station 206 and vehicle(s) disposed at a particular location, and/or the like).

With continued reference to FIGS. 2A, 2B, and 2C, various steps of a fueling operation are described in accordance with various embodiments. In a first step, vehicle identification data is communicated to station 206 via a "handshake" over NFC link 230. This step is commenced once the receptacle 255 and the nozzle 270 come within proximity to one another or establish contact with one another. For example, when nozzle 270 is connected to receptacle 255, unidirectional communication across NFC link 230 from vehicle 202 to station 206 occurs. During this communication, unique vehicle identification information (e.g., VIN) and static information about vehicle 202 hydrogen storage system(s) and/or components may be provided to station 206. Additional information may be transmitted as discussed above. This may occur, in various embodiments, in a manner similar to a cell phone performing an automated payment operation with a transceiver on vehicle 202. Safety information, for example a "watchdog timer," may also be relayed across NFC link 230. As described above, the information may be transmitted and received over the air between nozzle 270 and receptacle 255 and the various components associated therewith. The VIN may be used to identify, select, and/or establish V2X link 250 between vehicle 202 and station 206. At this point (e.g., once the handshake is complete), NFC link 230 may also be established as bidirectional, enabling station 206 to send data to vehicle 202 as well as receive data from vehicle 202 across NFC link 230. In various embodiments, bidirectional communication across either or both of NFC link 230 and V2X link 250 enables vehicle 202 to transmit or receive large amounts of high-speed data, for example, vehicle data, fueling operation data (e.g., the dynamic information described below), updated software and/or firmware for vehicle 202 components, media files. Additionally, operational information, including autonomous driving information, route information, diagnostic information, fuel cell health or performance information, or any other suitable or desirable information may also be transferred between vehicle 202 and station 206 via V2X link 250 and/or NFC link 230.

In a second step, station 206 controls the fueling operation of vehicle 202 or, more particularly, a hydrogen storage system associated therewith or disposed thereon. When fueling is initiated from dispenser 263, NFC link 230 is used to transmit data from vehicle 202 to station 206, for example as illustrated in FIG. 2C. The data may consist of fueling communication commands, the static information described above, dynamic information regarding the hydrogen storage system of vehicle 202, and/or the like. In various embodiments, the dynamic information may include, for example, fueling commands (e.g., start, stop, halt, abort, flow rate increase, flow rate decrease, tank change commands, etc.), real-time measurements of pressure and/or temperature within a tank 257 (including fluctuations of temperature and/or pressure within tank 257 which may be indicative of leakage and/or impending failure), ambient temperature outside tanks 257, a real-time measurement of the flow rate of hydrogen gas into tanks 257, and/or the like. Pertinent static and dynamic information may be used by station 206 (e.g., processed by station electronic control unit 220) to control fueling of hydrogen gas in one or more tanks 257. In this manner, system 200 ensures tanks 257 within vehicle 202 are filled relatively quickly and with up to 100% State of Charge (SoC) without compromising the safety limits of the tanks 257 (e.g., the temperature, pressure, or gas density limits set by the manufacturer or by various applicable standards). In various embodiments, one or both of NFC link 230 and V2X link 250 may also be used for transfer of other data from vehicle 202 to station 206, including, for example, encrypted data for payment and/or data confirming successful payment received by station 206.

In a third step, a fueling operation may be terminated, for example either automatically via one of station electronic control unit 220 or vehicle electronic control unit 210, or manually by a user at dispenser 263 (e.g., once 100% SoC or another fueling threshold is reached). Once a fueling operation is terminated, the user may disengage nozzle 270 from receptacle 255. NFC link 230 will stop communicating data when a physical distance between nozzle 270 and receptacle 255 becomes greater than a threshold distance. Likewise, V2X link 250 may also stop transmitting data responsive to cessation of data communication across NFC link 230. Alternatively, communication across V2X link 250 may continue after communication across NFC link 230 is terminated, for example in order to complete transmission of software or other desirable data between vehicle 202 and station 206. Yet further, in some exemplary embodiments, communication across V2X link 250 may terminate prior to communication across NFC link 230 being terminated, for example when a fueling operation has been completed but before nozzle 270 is removed from receptacle 255.

In various embodiments, exemplary systems and methods disclosed herein implement various approaches for preserving security and safety, for example in connection with gaseous fueling, electric charging, and/or the like. For example, NFC link 230 is designed to transmit data from vehicle 202 to station 206, and vice versa. An exemplary system has a safety integrity level on station 206 side of a minimum SIL 2, and on vehicle 202 side of a minimum of ASIL B/C, for example designed in accordance with IEC 61508 and ISO 26262. Compliance with exemplary current or future standards ensures safe fueling of vehicle 202 by transmitting the static information and the dynamic information described above over one or both of NFC link 230 and V2X link 250. Further, redundant configurations where, for example, NFC link 230 is rated at ASIL B/C and V2X link 250 is rated at ASIL B may result in an overall safety rating yielding a higher safety level than either of the individual safety levels by virtue of the redundant configuration, for example an overall safety rating of ASIL D. As noted above, while the present disclosure focuses on gaseous fueling of vehicle 202 by station 206, principles of the present disclosure contemplates the same or similar principles to be applicable to vehicles and stations configured for electric charging rather than for gaseous fueling and/or liquid fueling.

Still referring to FIGS. 2A, 2B and 2C, various further embodiments, benefits and advantages of the system 200 are described. For example, in various embodiments, NFC link 230 utilizes wireless communication, and may be restricted to operation within a separation distance (or a maximum separation distance) of about 20 centimeters (or other suitable distance, such as between about 1 centimeter and about 4 centimeters) between nozzle 270 and receptacle 255 to avoid data manipulation or interference from other vehicle (s). The separation distance may be used as a safety barrier to limit manipulation of or interference with communication between vehicle 202 and station 206, for example by other vehicles, hand-held electronics, malicious actors (e.g., individuals attempting to breach the security of such communication). In various exemplary embodiments, communication between nozzle 270 and receptacle 255 is operable within a separation distance of about 2 centimeters, or about 3.5 centimeters, or about 5 centimeters, or about 10 centimeters, or about 15 centimeters, or about 20 centimeters. However, any suitable separation distance is contemplated or may be utilized, for example depending on the NFC hardware utilized, the requirements of a particular NFC protocol or protocols, and/or the like.

In various embodiments, system 200 is configured for operation in an ambient temperature of about −40° Celsius to about +60° Celsius and in a humidity range of 0-100% (e.g., as will be appreciated, a vehicle fueling environment may often be dusty or rainy, and a vehicle may have organic or inorganic debris or contaminants disposed thereon, such as insect residue, oil-based compounds from asphalt roads, small tire particles, and/or the like). Moreover, system 200 is configured to handle vibration at vehicle 202. System 200 may, in various embodiments, include the same or similar equipment on both vehicle 202 side and station 206 side, for example similar NFC components; alternatively, equipment associated with vehicle 202 may differ in configuration, make, or capability from equipment associated with station 206. In various embodiments, vehicle NFC antenna 236 and vehicle electronic control unit 210 may be disposed on vehicle 202 near receptacle 255. Similarly, station NFC antenna 246 may be placed at or near nozzle 270. In various embodiments, components of system 200 may be configured with or exhibit the same or a similar physical size as an IrDA (Infrared Data Association) unidirectional communication system associated with a prior nozzle and receptacle. Moreover, station electronic control unit 220 may be mounted on a standard DIN (Deutsches Institut für Normung) rail at the station 206 side. On the vehicle 202 side, any suitable on-vehicle mounting bracket or other coupling or mounting components may be used. Moreover, the distance from nozzle 270, where station NFC antenna 246 is disposed, to station box 226, where station electronic control unit 220 is disposed, may be any suitable distance, for example up to and including about eight meters. During a fueling operation, hydrogen gas may be present in a vicinity outside the nozzle 270 and the receptacle 255 due to leaks. Accordingly, system 200 and components thereof may be configured and designed for use within classified area 232 (Zone 1), within a second classified area (Zone 2), and within a third classified area (Zone 3), for example in accordance with IEC 60079-10. In various embodiments, station box 226 may be located outside the second classified area (Zone 2) and vehicle box 216 may be located outside the third classified area (Zone 3).

In various exemplary embodiments, system 200 is configured to permit exchange and/or replacement of certain components, for example components of nozzle 270 in the event such components fail or become damaged, without changing the entirety of nozzle 270.

In various embodiments, system 200 may be utilized to transmit both static and dynamic data from vehicle 202 to station 206. It will be appreciated that there is no requirement for bidirectional communication to occur between station 206 and vehicle 202; however, bidirectional communication has various advantages as described herein. In various embodiments, data regarding a fueling operation (e.g., the static data and the dynamic data) is communicated and transferred at a suitable interval, including, for example, 200 millisecond (ms) intervals, 100 ms intervals, 50 ms intervals, 20 ms intervals, 10 ms intervals, or even more frequently and/or in real-time or near real-time, in order to allow system 200 to respond to or otherwise react to data regarding a fueling operation and thus more effectively and safely manage that fueling operation.

In various embodiments, system 200 utilizes an open design, unencumbered by any existing hydrogen fueling station communication standards (e.g., SAEJ2799 or SAEJ2601-1). However, it will be appreciated that system 200 may be utilized, if desired, in connection with any suitable existing or future protocol for hydrogen fueling, vehicle communication, and/or the like (for example, preliminary proposed fueling protocol ISO 19880-x). Moreover, communication components and/or protocols used in the system 200 may include the controller area network 215 for vehicle bus 211 on the vehicle 202 side and the PROFIBUS 223 (e.g., PROFIsafe—Profinet Slave) for the vehicle bus 221 on the station 206 side. Moreover, a communication channel or channels between vehicle 202 and station 206 may, in various embodiments, comply with the specifications of IEC 61784-3 to enable safe communication. Yet further, NFC link 230 and V2X link 250 may be configured for approval and permitted for use on a vehicle and a hydrogen fueling station in the United States, the European Union, and/or other countries and locations around the world.

In various embodiments, a method for hydrogen fueling is contemplated for use with one or two types of communication links, used individually or in tandem. The method is implemented using a minimum rating for NFC link 230, where the minimum rating provides a system considered "safe" (e.g., a rating having a likelihood of failure of minimum SIL 2 and ASIL B). In a tandem approach, NFC link 230 may be used primarily to identify vehicle 202 in connection with a communication handshake before fueling, and also to identify a particular wireless network wherewith to establish communication over V2X link 250. However, it will be appreciated that, in various embodiments, NFC link 230 and V2X link 250 may be utilized in a redundant fashion, as desired, in order to transfer the same (or similar) information between vehicle 202 and station 206.

Further, in various embodiments and as discussed above, safety ratings for both NFC link 230 and V2X link 250 may be combined or added together in order to achieve a higher overall SIL rating for system 200 or a subpart thereof. For example, if NFC link 230 exhibits an ASIL B rating and V2X link 250 exhibits an ASIL B rating, then, when combined, the overall rating for system 200 or a subpart thereof may be established as an ASIL D rating. Under an ASIL D rating, an exemplary fueling protocol may rely on the combined communication links for safety functions, such as custom fueling protocols. The communication links may be redundant such that if one communication link fails, there still remains a communication link for sending information between vehicle 202 and station 206, thereby maintaining communication between vehicle 202 and station 206.

In various embodiments, NFC link 230 may be configured to transfer specific commands and feedback from dispenser 263 during a fueling operation. The design of NFC link 230 may include suitable approaches, such as bidirectional communication, handshaking, watchdog signals, and/or "black channel" approaches to achieve a desired safety rating. Moreover, an exemplary communication protocol may include or utilize specific fueling data as dynamic values, such as pressure and temperature values within hydrogen components of vehicle 202 for safe fueling. Moreover, for optimized fueling, static values of a hydrogen storage system may include specific volume, type of tanks, number of tanks, geometry, numbers of fueling, an abort signal or the like.

In various exemplary embodiments, if a communication link fails, either before a fueling operation commences or during the fueling operation, the fueling operation may continue for a period of time, for example based on the static values or previously received dynamic values. In this manner, rather than being required to immediately abort a fueling operation responsive to a communication failure, system 200 enables a fueling operation to run to completion (or at least partway to completion) after a partial or total communication failure. For example, if prior to a communication failure dynamic values indicated a particular tank 257 was 50% full, system 200 may elect to continue a fueling operation in a manner anticipated to fill tank 257 to a level of 80% full, potentially providing vehicle 202 with sufficient range to reach a desired location, such as a final destination or a service center for further evaluation.

In addition to the foregoing concepts applicable to hydrogen fueling operations, various principles and concepts disclosed herein are applicable to charging electric devices, such as, for example, electric vehicles. In various embodiments, for example, NFC link 230 may be utilized when a charging cable from a charging station is brought into proximity with a connection point on an electric vehicle. NFC link 230 may then be employed to identify and establish a link or protocol for V2X link 250 between the electric vehicle and the charging station. Information regarding the batteries in the electric vehicle, various charging process parameters and the status (e.g., total estimated time to charge, time elapsed, time remaining, kWh of charge completed, kWh of charge to be completed, and/or the like), payment for charging, software and firmware updates, and so forth may then be transferred bidirectionally between the charging station and the electric vehicle via one or both of NFC link 230 and V2X link 250. In this manner, an optimized charging for the electric vehicle may be achieved. Additionally, in this manner improved control and/or monitoring of the electric vehicle may be enabled.

Figure 3A:
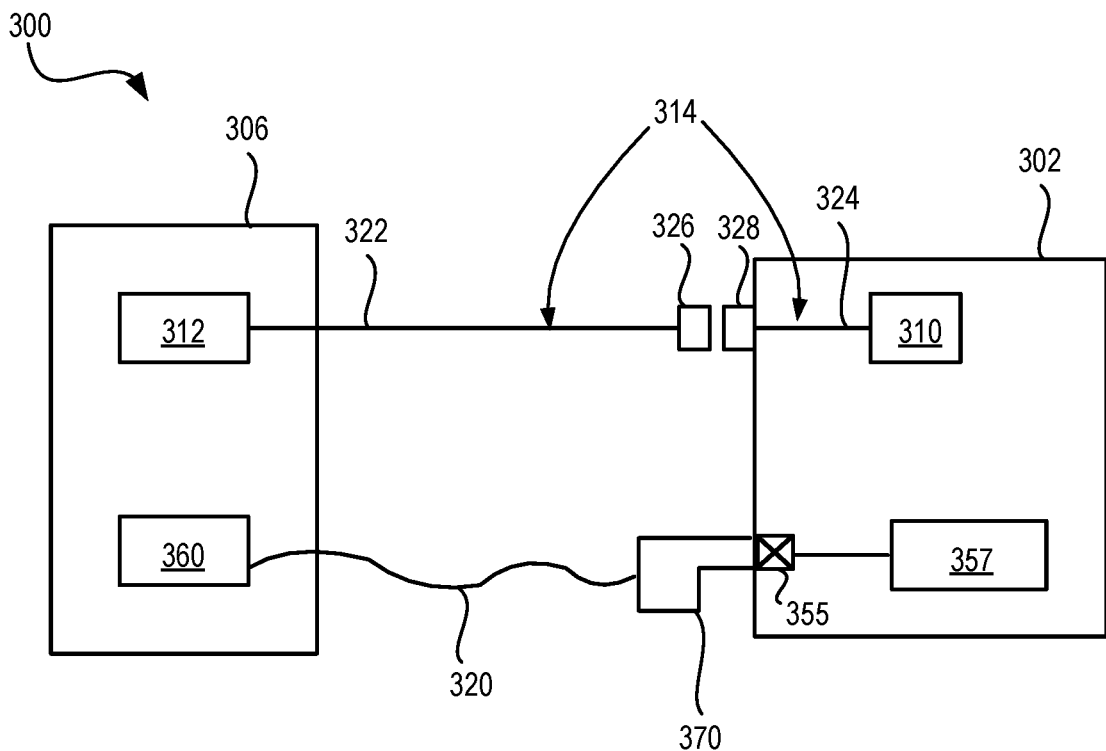
FIGS. 3A and 3B illustrate an exemplary hydrogen fueling communication system, in accordance with an exemplary embodiment.
Figure 3B:
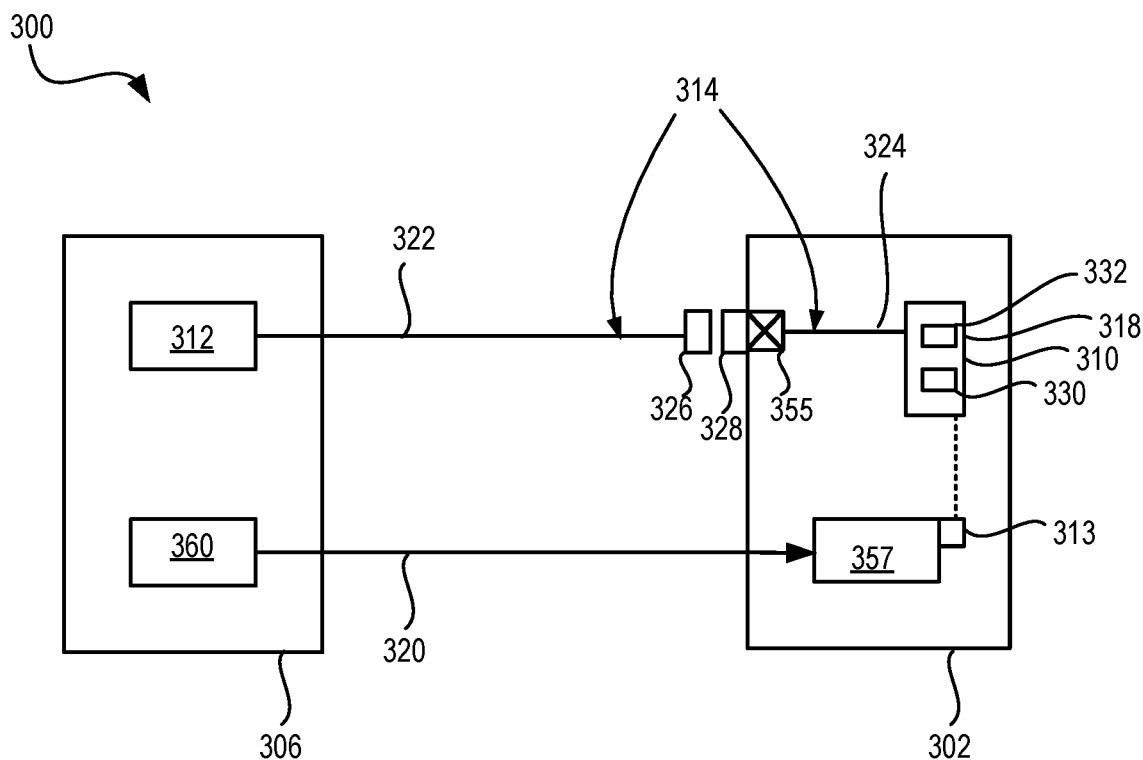

Turning now to FIGS. 3A, 3B, 4, and 5, various additional methods, systems, and components for safe and reliable fueling approaches are described in accordance with the principles of the present disclosure. In various embodiments, exemplary systems and methods facilitate fueling a generic fleet of vehicles with variable tank sizes, for example in compliance with the SAE J2601-1 standard used for fueling of vehicles. Referring to FIGS. 3A and 3B, a system 300 employing a safe communication hardware methodology and associated software and hardware components is disclosed with specific reference to a gaseous hydrogen fueling station and a vehicle undergoing a gaseous hydrogen fueling operation. In various embodiments, system 300 enables unidirectional or bidirectional communication between a vehicle 302 having a tank 357 (e.g., a hydrogen storage tank) and a vehicle data unit 310 and a station 306 having a station control module 312 for gaseous hydrogen fueling as well as for general communication (e.g., financial payment, authentication, vehicle identification, or the like) between vehicle 302 and station 306. A data communication channel 314 is configured for transfer of data between vehicle data unit 310 and station control module 312.

In various embodiments, data communicated via data communication channel 314 is considered sufficiently reliable to trust during the control of the fueling operation— e.g., a fueling operation may proceed without the need for monitoring various tank parameters. Exemplary tank parameters may include specific tank type, tank size, real-time temperature or pressure in the vehicle tank, and so forth. Accordingly, by application of the principles of the present disclosure, system 300 obtains various advantages of a so-called "fueling with communication" approach (e.g., operation of system 200 described above with reference to FIGS. 2A-2C) while executing a so-called "non-communication fueling" approach. This is possible as tank specification data (e.g., the tank data ultimately transmitted from vehicle 302 to station 306) of tank 357 to be fueled is received by station 306 according to an exemplary embodiment.

Advantages provided via transfer of tank 357 data include that a fueling may be optimized by making the fueling faster, safer, with a higher chance of achieving 100% SoC, and/or with more efficient use of a hydrogen storage and compressor facility within station 306. This can result in a less expensive station compared to stations using a generic protocol (such as, for example, SAE J2601-1) that does not implement safe data communication. Further, via principles of the present disclosure, the likelihood of incidents and potential hazardous situations where the tank 357 is overfilled (e.g., filled to a higher pressure, temperature, or fill density than rated) is reduced. This is because relevant data is communicated safely, and thus station control module 312 is able to take appropriate action before a situation evolves based on trusted information regarding the tank 357.

In various embodiments, to achieve the above advantages, it is desirable to safely communicate data (or at least verify the data received from vehicle 302 by station 306 is valid or trustworthy). In an exemplary embodiment, characteristics of tank 357 are determined and communicated in a safe manner via data communication channel 314 to station 306. It is desirable to use hardware and/or software components that are designed and approved for use in a safety instrumented system. This means the design of such software or hardware preferably will comply with IEC 61508 or similar standards, and data communication preferably will comply with IEC 61784-3 or similar standards. Each hardware or software subsystem or component related to fueling of tank 357, therefore, preferably complies with IEC 61508 or the equivalent and obtains a SIL rating of at least 2. However, any suitable hardware or software may be utilized. In a similar manner, data communication channel 314 may be implemented using a white channel or a black channel (with the so-called PROFIsafe or EtherCAT communication protocol as examples). See, e.g., IEC 61784-3. Preferably, as an alternative or in combination hereto, communication between station 306 and vehicle 302 may at least partly include a communication loop. Such communication loop may serve at least two purposes, namely: (i) verifying if a connection between station 306 and vehicle 302 is established; and (ii) providing validation of data received from vehicle 302. In one exemplary embodiment, system 300 may be implemented as a standard TCP/IP communication system, on top of which an appropriate safety protocol is added to comply with, for example, SIL 2 requirements. EtherCAT Safety (a/k/a "FSoE" or "Fail Safety over EtherCAT") and PROFIsafe are examples of standards for safe communication adding appropriate safety. Moreover, use of PROFIsafe is advantageous in that no requirements to hardware are added to implement fail safe data communication within system 300. However, any suitable safety additions or protocols may be utilized.

In various embodiments, data communication channel 314 may include an infrared (IR) transmitter or receiver, thereby facilitating infrared communication at a data communication interface between station 306 and vehicle 302. In this way, data exchanged over an infrared link may be used as part of a safe data transmission between station 306 and vehicle 302. In an exemplary embodiment, one way of transmitting the data is by using an existing unidirectional IR communication via a nozzle 370 to identify vehicle 302. Bidirectional IR communication may also be used to facilitate the data exchange, provided nozzle 370 is equipped with appropriate bidirectional communication hardware.

In various embodiments, data communication channel 314 may be safely implemented via an industrial wireless local area network (for example, compatible with IEEE 802.11) or via a physical cable connecting station 306 and vehicle 302. Wireless communication utilizes wireless access points at both the station 306 and the vehicle 302. An advantage of using a physical cable is station 306 is directly connected and may thus verify a specific vehicle 302 for fueling. Moreover, combinations of the mentioned wireless (including infrared, RFID, Bluetooth, Wi-Fi, or other techniques) and wired communication channels may also be used. If the data communication channel 314 is wireless, at least one access point may be implemented in relation to or as part of a sensor 313 measuring relevant dynamic information of tank 357. As mentioned, principles of the present disclosure are advantageous in that station 306 is enabled to perform a fast and high-density fueling without being updated with or relying on dynamic data. Moreover, separate data communication hardware, such as a tank identification device 318 or other hardware (e.g., an interface (10) module) is preferred for communicating static tank data; using such data, station 306 may perform a fueling.

Referring specifically to FIG. 3A, an exemplary embodiment is illustrated, where station control module 312 communicates with vehicle data unit 310 located in vehicle 302. The station control module 312 is configured for communicating with vehicle data unit 310 via data communication channel 314. If vehicle data unit 310 does not facilitate data communication to station 306, an interface module may be used to facilitate this communication. The tank 357 receives hydrogen from a hydrogen storage tank 360 via a dispenser (not illustrated) and a fuel hose 320 with nozzle 370 attached thereto. The fueling operation may be controlled by station control module 312 and/or may be informed by vehicle data unit 310. The main component of station control module 312 is a programmable logic controller (PLC), but data storage or other exemplary computational or communication components may be used, as suitable.

In various embodiments, data communication channel 314 may be implemented as a physical cable enabling a station data communication channel 322 and a vehicle data communication channel 324. The station data communication channel 322 and the vehicle data communication channel 324 are configured to communicate via a station data interface 326 and a vehicle data interface 328. Hence, when connected, data communication channel 314 between station control module 312 and vehicle data unit 310 is established, facilitating communication (e.g., via PROFIsafe or the like). The station data interface 326 and vehicle data interface 328 may be implemented as a plug and socket electric connection, as optical transceivers, as magnetically coupled connections, via a Universal Serial Bus-compatible connection, and/or as any other suitable alternatives. If data communication channel 314 is implemented by a physical cable, the cable preferably comprises at least two electric conductors, but may be a multi-conductor cable, an optical cable, or the like. The cable is preferably robust and able to comply with the environment near and/or around station 306 with respect to temperature, humidity, rain or snow, and so forth. In exemplary embodiments where station data interface 326 and vehicle data interface 328 comprise a plug and a socket, a connection may be made at vehicle 302 (e.g., adjacent to and/or nearby where nozzle 370 is attached to a receptacle 355). An appropriate connection type for a physical cable is robust and easy to connect. Preferably, it should be colored (e.g., red) to identify it is part of a hydrogen fuel dispenser and facilitate the use of the PROFIsafe communication technique. Preferably, the physical cable may be connected to vehicle 302 with a safe distance established between the cable and nozzle 370 and receptacle 355 of vehicle 302. In an alternative embodiment, the station data interface 326 and the vehicle data interface 328 are optoelectronic, preferably facilitating infrared and/or radio frequency data transmission utilizing station data communication channel 322 and the vehicle data communication channel 324. When optical communication is utilized, both station data interface 326 and vehicle data interface 328 facilitate transforming an electrical signal to and from an optical signal via appropriate hardware and communication protocols.

Referring more specifically to FIG. 3B, in another exemplary embodiment, station control module 312 communicates with vehicle data unit 310 implemented as tank identification device 318. In various embodiments, tank identification device 318 comprises a first input module 330 (facilitating communication of static data) and/or a second input module 332 (facilitating communication of either or both of static data and dynamic data). In various embodiments, first input module 330 may be a hardware unit configured to store static data related to tank 357. Based on this data, station control module 312 may determine a fueling protocol. The configuration may be done by adjusting switches, resistors, circuits, capacitors or the like, so that on request the static datum or data based on which static data may be derived (e.g., a binary number or current level) is communicated to station 306. The request for data may be made by or upon connecting station data interface 326 and vehicle data interface 328 (e.g., by a digital signal, applying a voltage, or the like). In various exemplary embodiments, the static data includes information from which the vehicle tank(s) 357 may be identified (e.g., tank specification data including, for example, volume, material, and the like). This static data is constant with respect to a particular tank 357 and, therefore, the first input module 330 may be configured at an appropriate time, for example during manufacturing of vehicle 302 when the tank 357 type is determined, or when a particular tank 357 of vehicle 302 is replaced with another tank 357 which may differ in one or more aspects. The second input module 332, which is preferably a safety analog module, may be connected to sensor 313 (or to a plurality of sensors, including a temperature sensor and a pressure sensor) of vehicle 302. The second input module 332 facilitates communication of, for example, real-time values of tank temperature and pressure to station 306. The second input module 332 may communicate wirelessly or by cable with sensor 313 of tank 357.

The first input module 330 and the second input module 332 may be connected to vehicle data interface 328. Thereby, when vehicle data interface 328 is connected with station data interface 326, data communication channel 314 from sensor 313 to station control module 312 is established. The vehicle data interface 328 may be implemented as a simple connector adapted to receive a cable or wireless communication from station 306, creating data communication channel 314 between station control module 312 and vehicle data unit 310. In various embodiments, vehicle data interface 328 and vehicle data unit 310 may be integrated, forming a single unit (which may be referred to as a communication node), or connected by vehicle data communication channel 324.

As described above, in various exemplary embodiments, if vehicle data unit 310 is implemented as a tank identification device 318, it may be a passive unit. This is advantageous in that the vehicle portion of an exemplary embodiment may be less expensive and easier to service and maintain. However, if tank 357 is replaced by a tank having different static data, the tank identification device 318 should be updated to reflect the characteristics of the new tank 357. Preferably, however, vehicle data unit 310 is an active device, such as, for example, a PLC in which the static data is stored and which communicates with sensor 313. Preferably, station control module 312 is continuously polling for data from vehicle data unit 310 at a given frequency and/or interval, examples of which include 10 Hz, 50 Hz, 100 Hz, 200 Hz, and so forth; moreover, interrupt-based and/or real-time or near real-time communication approaches may be utilized, as appropriate, in order to allow station 306 and/or vehicle 302 to predict, react to, and/or control events and actions associated with fueling of vehicle 302.

According to an exemplary embodiment, station control module 312 determines a fueling protocol specific to tank 357 from which data is received. This is done based on the received data and verified by the inherent verification included in the safe data communication protocol (e.g., a property of the PROFIsafe protocol used for communication of data over data communication channel 314). However, any suitable verification protocol or approach may be utilized. The verification may be made by station control module 312 returning the received data to vehicle data unit 310, which then verifies and communicates the result of the verification back to station control module 312. In the configuration where vehicle data unit 310 is passive, the mere existence of a continuous voltage or a current may be translated to the needed data, for example by a look up in a data storage based thereon or indexed thereto. A verification that data communication channel 314 exists is obtained as long as the voltage or current is present. Alternatively, the data may be obtained by a unique identification from vehicle 302 to station control module 312.

When at least the static data is received and verified, a fueling protocol may be determined. Below is a list of exemplary data that may be received by the station control module 312 from the vehicle data unit 310. Whether data communication channel 314 is established by a cable or wireless, data related to tank 357, also referred to as tank specification data, desirably includes the following static data: the tank volume (e.g., between 400 liters and 2100 liters, or any suitable size); a pressure rating associated with the tank; the tank type (e.g., Type 1, 2, 3, 4 . . . ); the number of tanks (e.g., 1, 2, 3 . . . ); the geometric dimensions of a tank or the tanks (e.g., length, diameter, etc.); the materials used to construct the tank(s); manufacturing data of the tank(s); the last service date of the tank(s); and the serial number of the tank(s) and the like. In addition, the following dynamic data is also desirable to receive from the vehicle data unit 310 to improve the establishing of the fueling protocol: a fueling command (e.g., dynamic, start, halt, abort, etc.); a real-time measurement of pressure within the tank(s); a real-time measurement of temperature within the tank; the ambient temperature; a software version identifier; a protocol relating to a last fueling; the number of vessels in the vehicle; a pressure drop measurement; the vessel geometry; a heat capacity of the tank, and the like. According to an exemplary embodiment, the static data and verification thereof is utilized for the fueling operation to commence and to ensure that the station control module 312 establishes an optimal fueling protocol for fueling the tank 357. The dynamic information is optional according to this exemplary embodiment and, if available, it may be used to optimize or inform about the fueling operation.

In some embodiments, a fueling operation for the vehicle 302 proceeds as follows: When vehicle 302 arrives at station 306, the person or apparatus fueling tank 357 initiates the fueling operation by activating a dispenser or attaching nozzle 370 attached to fuel hose 320 to receptacle 355. Thereby, a fueling channel is created from hydrogen storage tank 360 to tank 357. The dispenser may be integrated into a station central module. Even though the principles of the present disclosure are suitable on any type of vehicle, they may be especially advantageous when buses or other larger vehicles are fueled, for example in the scenario where buses or heavy-duty trucks (such as class 8 trucks) are equipped with tanks of Type 4, where the temperature gradient is lower than tanks of Types 2 and 3 as an example; thus, the temperature rise of such tanks during fueling may be slower than the temperature rise of a typical tank for a passenger automobile. The data communication of exemplary embodiments facilitates or ensures that tank 357 is not overfilled, and it leads to a faster fueling operation, a higher end pressure, and a higher density.

If a wireless communication is used, data communication channel 314 is preferably automatically established, and if a physical cable is used, it should be physically connected to vehicle 302. Based on a communicated signal through either a wireless link or a cable, a signal from vehicle 302 is sent to station 306. The signal may contain a unique ID (based on static data) or static data or dynamic data as mentioned above linked to tank 357 or vehicle 302. Preferably, data linked to the vehicle tank volume and type is utilized, as this information is sufficient to determine an appropriate fueling protocol for some embodiments.

According to an exemplary embodiment, a unique ID may be a binary number, or a current value depending on the configuration of first input module 330 of vehicle data unit 310. A plurality of fueling protocols or parameters is preferably stored in a database or a table at station 306, or optionally remote thereto if networked data communication to station 306 is available. Based on the data received, a fueling protocol matching (or suitable for) tank 357 to be fueled is established from among the plurality of fueling protocols or parameters. Alternatively, rather than determining a new protocol, parameters of a generic protocol may also be used and, if considered necessary, changed based on the received tank 357 related data. If no data is received, or if data regard tank 357 cannot be verified as correct, a conservative fueling protocol may be chosen, leading to a slow fueling and ending with a low density in the tank 357. Hence, by use of the exemplary principles of the present disclosure, station 306 may be configured to use an individual fueling protocol tailored specifically to the tank 357, enabling a fueling operation having the above-mentioned advantages. A fueling protocol in this context may be defined as needed, for example, by the target pressure and the ramp rate of the filling.

In accordance with various exemplary embodiments, when dynamic values are not available to the fueling station controller, a suitable protocol for fueling may be established based on only the static values of vehicle 302. If some or all dynamic data is available, the fueling protocol is preferably dynamic in response to changes in the received data. As mentioned above, the verification or acknowledgement from vehicle 302 that the data received in the first place is correct is desirable. The verification is preferably done by the safe data communication protocol used to communicate data via data communication channel 314. As also mentioned above, the verification may be an inherent part of a safe data communication protocol and may therefore not be an individual or separate step. After the data received from vehicle 302 is verified, station 306 permits or initiates a flow of hydrogen from station 306 to tank 357.

In various exemplary embodiments, a default protocol or protocols are preferably made or established prior to the commissioning of station 306 or at least prior to a fueling operation. Hence, in an exemplary embodiment, no calculations are needed during fueling; rather, only pressure of the hydrogen provided to vehicle 302 is measured. This is to verify that the pressure stays within the upper and lower limits of the established fueling protocol. Further, principles of the present disclosure are advantageous in that, in various exemplary embodiments, vehicle 302 does not need additional safety transmitter components or controllers, as temperature and pressure measurements from vehicle 302 are not mandatory for establishing a fueling protocol. The only data vehicle 302 may send is a unique ID identifying tank 357 of the vehicle 302, or the above-mentioned static data linked to the tank 357.

In various exemplary embodiments, the fueling protocol may be further optimized if at least some of the dynamic data is provided to station 306, such as, for example, the real-time pressure and temperature measurements. A database or table may include fueling protocols for use both with or without the dynamic data. The temperature of the tank 357 may be established, for example, by simulation of hot soak and cold soak assumptions (e.g., tank temperature estimations based on measured ambient temperature). Hence, static data and dynamic data such as tank temperature, may be used to establish the fueling protocol.

If a vehicle 302, which is new to station 306 (e.g., having an unknown tank 357-N or tank system) is to be fueled by station 306, a simulation including data of the new tank 357-N volume and type, among other variables, may be conducted prior to the first fueling of new vehicle 302. This approach may be utilized to establish a fueling protocol which, when followed, ensures or is intended to ensure the temperature and/or pressure stays within the range limits of the newly-presented tank 357-N. Accordingly, a desirable way of establishing a fueling protocol is to simulate a plurality of fueling operations to determine an optimal protocol during which the temperature and/or pressure is kept within the limits of tank 357-N. When established, the fueling protocol may be made and uploaded to station 306 and used when the new vehicle 302 with the new tank 357-N is to be fueled. The selection of such new fueling protocol may then be made as described above based on received and preferably also acknowledged and verified vehicle or tank ID or static data. Alternatively, a fueling of a new tank 357-N for which a protocol has not yet been established may be made based on measured temperature and pressure according to conventional fueling methods. Before such new fueling protocol is used in a fueling, however, a vehicle 302 with an unknown tank 357-N may be fueled according to a conservative fueling protocol. If a custom fueling protocol cannot be established, a safe mode fueling or conservative fueling such as the fueling described in SAE J2601 may be used.

Figure 4:
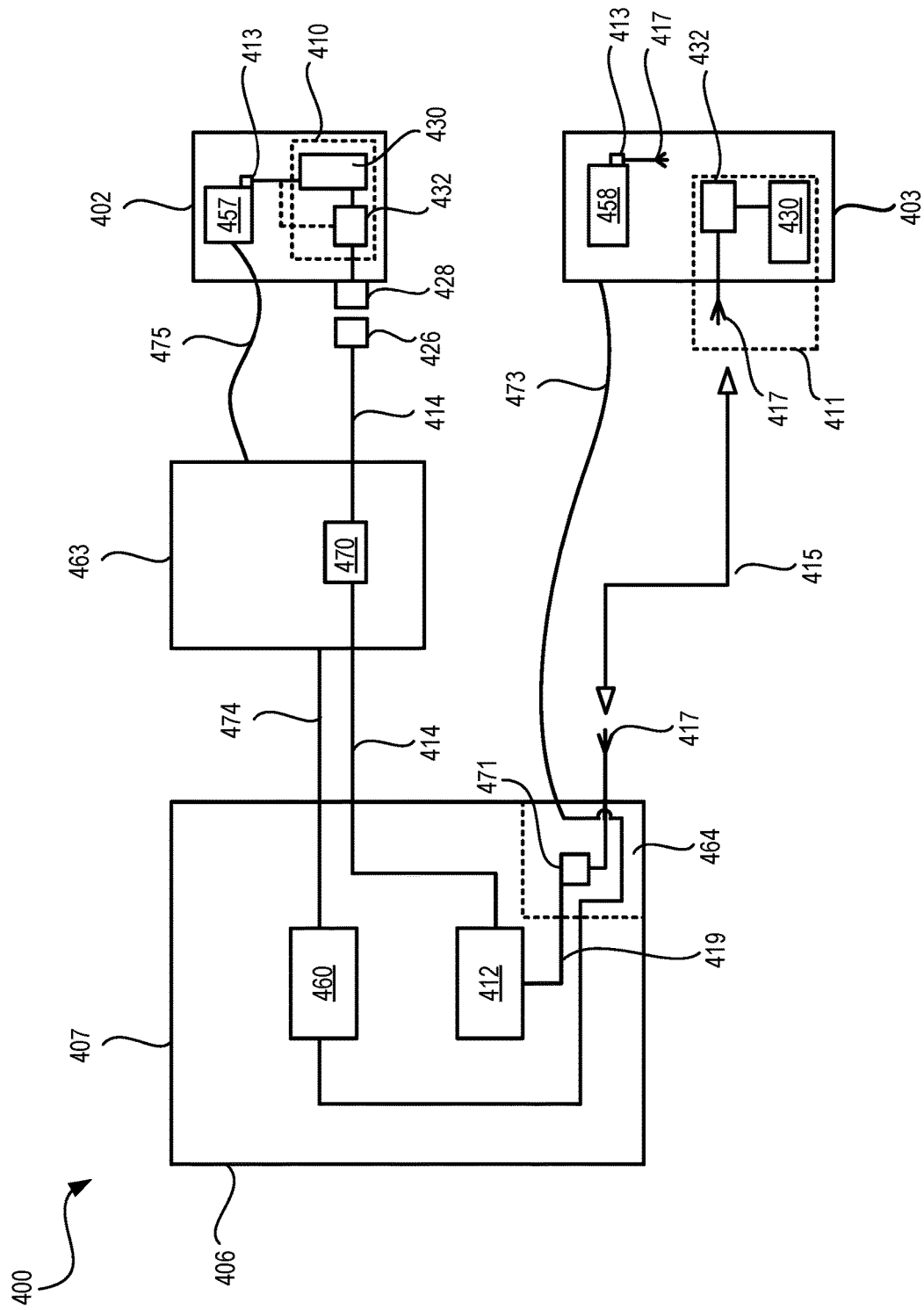
FIG. 4 illustrates an exemplary hydrogen fueling communication system, in accordance with an exemplary embodiment.

Referring now to FIG. 4, a system 400 employing a safe communication hardware methodology and associated software and hardware components is disclosed with specific reference to a gaseous hydrogen fueling station and a vehicle undergoing a gaseous hydrogen fueling operation. In various embodiments, system 400 enables unidirectional or bidirectional communication between a first vehicle 402 having a first vehicle tank 457 (e.g., a first hydrogen storage tank) and a first vehicle data unit 410 and a station 406 having a station control module 412 for gaseous hydrogen fueling as well as for general communication (e.g., financial payment, authentication, vehicle identification, and so forth) between first vehicle 402 and station 406. A first data communication channel 414 is configured to transfer data between first vehicle data unit 410 and station control module 412. In various embodiments, system 400 also enables unidirectional or bidirectional communication between a second vehicle 403 having a second vehicle tank 458 (e.g., a second hydrogen storage tank) and a second vehicle data unit 411.

Similar communication takes place between the second vehicle 403 and station 406. A second data communication channel 415 is configured for transfer of data between second vehicle data unit 411 and station control module 412. Both first vehicle 402 and second vehicle 403 may include a sensor 413 (or a plurality of sensors configured to detect, for example, real-time values of temperature or pressure within the corresponding vehicle tanks), a first input module 430 (facilitating communication of static data) and/or a second input module 432 (facilitating communication of either or both of static data and dynamic data).

In various embodiments, data communicated by first data communication channel 414 and second data communication channel 415 is considered sufficiently reliable to trust during the control of the fueling operation—e.g., a fueling operation for tanks 457, 458 may proceed without the need for monitoring various tank parameters as disclosed above.

FIG. 4 illustrates, in accordance with an exemplary embodiment, station 406 comprising a center module 407 and a first dispenser 463 (or an external dispenser located external to the center module 407) and a second dispenser 464 (or an internal dispenser located internal to the center module 407). Moreover, in various embodiments, both first dispenser 463 and second dispenser 464 may be internal or external to center module 407. In various embodiments, the first dispenser 463 is located remote from station 406, from which both first data communication channel 414 and a fluid path between a hydrogen storage tank 460 and the first vehicle tank 457 is established. The fueling may be controlled from station control module 412 connected to a first dispenser controller 470 located at first dispenser 463. If the fueling is controlled from first dispenser controller 470 in first dispenser 463, the need for first data communication channel 414 between center module 407 and first dispenser 463 depends on the configuration of the system—e.g., whether or not first dispenser 463 is required to communicate with station control module 412. In various embodiments, where a PLC is located in center module 407 and, for example, first dispenser controller 470 is located at first dispenser 463, it is preferred that first data communication channel 414 also facilitates communication via a safe data communication protocol.

According to an exemplary embodiment, first data communication channel 414 uses a safe data communication protocol with built-in verification and acknowledgement of the data transmitted between station 406 and first dispenser 463 and between first dispenser 463 and first vehicle 402. In various embodiments, first data communication channel 414 may comprise a simple wired current loop. In various exemplary embodiments, the wires comprising first data communication channel 414 are connected to one or more electronic components, such as, for example, one or more resistors located within first vehicle data unit 410. When a voltage is applied, a current may be measured or drawn from the resistors. The current drawn may be linked to information of the static tank specification data which then is sent via first data communication channel 414 to station 406 where a fueling protocol is determined for the first vehicle tank 457. As illustrated, a station data interface 426 and a vehicle data interface 428 may also, in an exemplary embodiment, facilitate the connection. Moreover, the electronic components may be integrated in vehicle data interface 428.

With continued reference to FIG. 4, in various exemplary embodiments second dispenser 464 is located internal to center module 407 and configured for connection (e.g., for communication and for fueling) to second vehicle 403. As illustrated, second data communication channel 415 may be wirelessly established between second dispenser 464 and second vehicle 403, with one or more wireless antenna(s) 417 configured to establish second data communication channel 415 as a wireless link. The second dispenser 464 may be controlled by a second dispenser controller 471 or may be controlled by station control module 412. In the latter case, second dispenser controller 471 may comprise a remote I/O module. In various embodiments, a hardwire link 419 may complete second data communication channel 415 between station control module 412 and second dispenser controller 471. In various embodiments, first dispenser 463 is connected to center module 407 via a first hydrogen supply line 474 and first data communication channel 414. A second hydrogen supply line 475 connects first dispenser 463 to first vehicle tank 457 (e.g., via a nozzle and a receptacle as described above with reference to FIG. 2A). The first dispenser 463 is preferably controlled by station control module 412 with first dispenser controller 470 comprising a remote I/O module located at first dispenser 463. A hydrogen supply line 473 connects second dispenser 464 to second vehicle tank 458 via a nozzle and a receptacle.

Control of the foregoing embodiments includes the above-mentioned techniques for establishing of a fueling protocol based on static data received from either first vehicle 402 or second vehicle 403 and the subsequent fueling of first vehicle tank 457 and second vehicle tank 458. Hence, in configurations including one or more dispensers— e.g., first dispenser 463 and second dispenser 464—station control module 412 may be supplemented by dispenser control modules—e.g., first dispenser controller 470 and second dispenser controller 471—which then act in place of or in conjunction with station control module 412. In a current loop embodiment, data communication between first dispenser controller 470 and second dispenser controller 471 and station control module 412 may not require a safe data communication channel. In various embodiments, dispenser control modules may be slave to, be controlled by, or at least communicate with (e.g., as a remote I/O module) station control module 412. Accordingly, in various embodiments, the receiving of tank specification data, the establishing of the fueling protocol, and the control of the fueling operation may be performed either by station control module 412 located at center module 407 or by dispenser control modules—e.g., first dispenser controller 470 or second dispenser controller 471.

Figure 5:
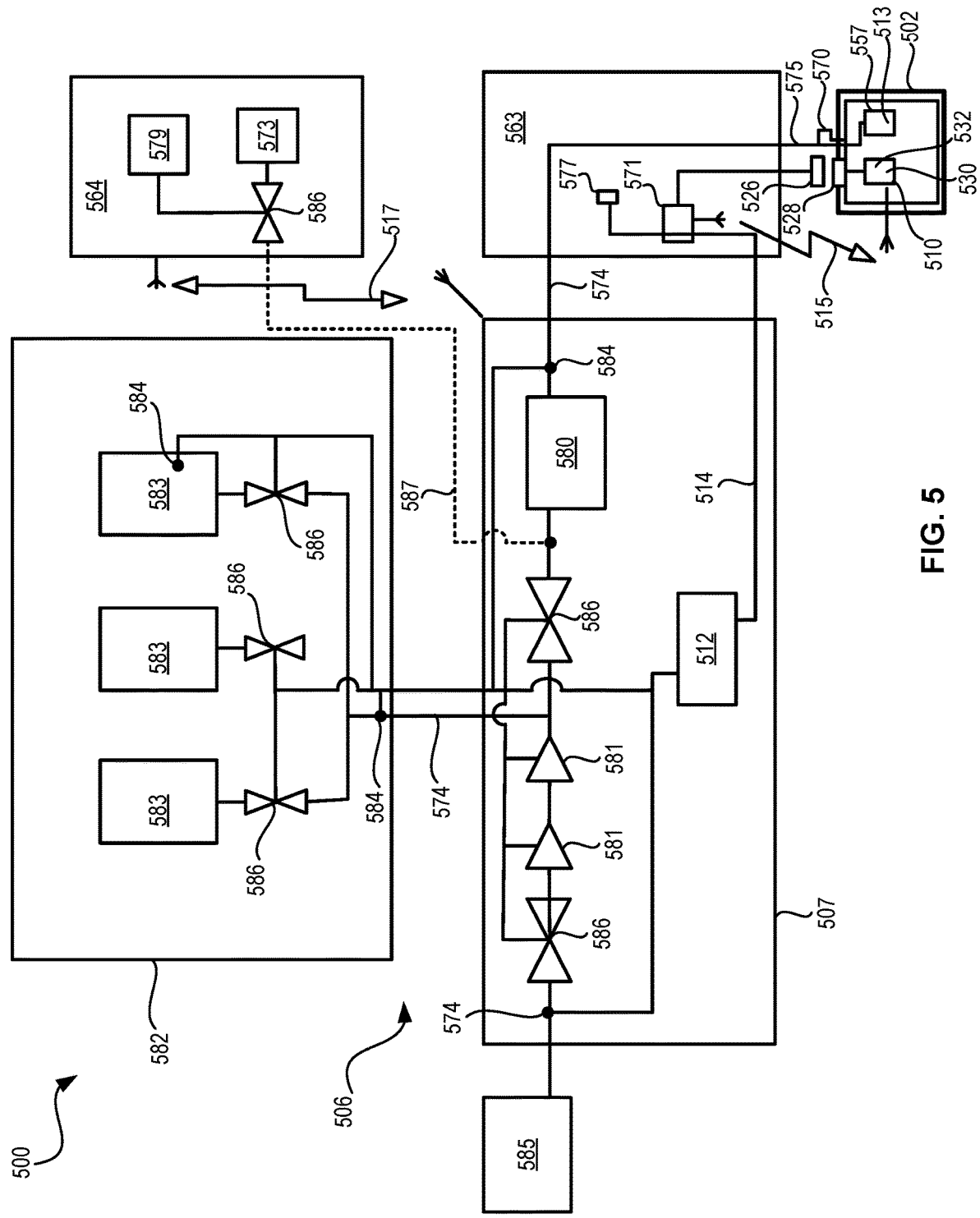
FIG. 5 illustrates an exemplary hydrogen fueling communication system, in accordance with an exemplary embodiment.

Referring now to FIG. 5, a system 500 employing a safe communication hardware methodology and associated software and hardware components is disclosed with specific reference to a gaseous hydrogen fueling station and a vehicle undergoing a gaseous hydrogen fueling operation. In various embodiments, system 500 enables unidirectional or bidirectional communication between a vehicle 502 having a vehicle tank 557 (e.g., a hydrogen storage tank) and a vehicle data unit 510 and a station 506 having a station control module 512 for gaseous hydrogen fueling as well as for general communication (e.g., financial payment or vehicle identification) between vehicle 502 and station 506. Communications between vehicle 502 and station 506 may be implemented in accordance with various exemplary embodiments disclosed above.

The station 506 includes a center module 507, which preferably includes a heat exchanger 580 configured to cool gaseous hydrogen and one or more compressors 581. A dispenser 563 is connected to center module 507. Hydrogen may be communicated via a supply line 574 to the dispenser 563 and data may be communicated between center module 507 and dispenser 563 via a data communication channel 514. Hydrogen is communicated to vehicle 502 via a hose 575 and a nozzle 570 and data is communicated between dispenser 563 and vehicle 502 as discussed herein. A sensor 577 may be configured to monitor one or more of temperature, pressure and mass flow rate within the dispenser 563 or components thereof.

In an exemplary embodiment, vehicle interface 528 may comprise a first input module 530 (facilitating communication of static data) and/or a second input module 532 (facilitating communication of either or both of static data and dynamic data). The first input module 530 is not required to be connected to any other vehicle 502 components. Hence, in this exemplary embodiment, vehicle interface 528 may be combined with vehicle data unit 510. It may be implemented as a passive electronic device only responding when queried. Hence, first input module 530 is, in an exemplary embodiment, a passive standalone device located at the vehicle 502 with no connection to other vehicle 502 components. It may be positioned close to the receptacle to which the nozzle 570 is configured to connect, facilitating flow of hydrogen to the vehicle tank 557. In an exemplary embodiment, station interface 526 and nozzle 570 are integrated into a single unit. The first input module 530 and second input module 532 may comprise a single module; however, the dynamic nature of second input module 532, which is optional, indicates that such input module is communicating with sensors, data processors, memories, or the like. Such components, include, for example, a sensor 513 (or a plurality of sensors configured to detect, for example, real-time values of temperature or pressure within the vehicle tanks) in communication with the vehicle tank 557.

A hydrogen fuel storage module 582 may comprise one or more storage tanks 583. A plurality of pressure sensors 584 may be disposed throughout system 500, including within or external to one or more storage tanks 583, for example, and/or at various locations along the various conduits that comprise supply line 574. Each pressure sensor 584 is typically connected to station control module 512. The hydrogen fuel storage module 582 is preferably external to center module 507 (or to an enclosure that houses the center module 507), and the pressures within system 500 may vary from a few hundred bar to over 1000 bar. However, in various embodiments, hydrogen fuel storage module 582 may be enclosed in a single housing along with center module 507. Preferably, the plurality of storage tanks 583 within hydrogen fuel storage module 582 contain hydrogen under pressures of between 500 bar and 1000 bar, although any suitable pressure of hydrogen in storage tanks 583 is contemplated herein. A hydrogen supply tank 585 is also preferably connected to center module 507. The hydrogen supply tank 585 may be a temporary facility, such as, for example, a tank within a trailer, or a permanent facility. In various embodiments, the pressure within hydrogen supply tank 585 is stored at a lower pressure relative to storage tanks 583 (e.g., below 200 bar), for example in order to facilitate movement of hydrogen along a downward pressure gradient. The flow of hydrogen from hydrogen supply tank 585 to hydrogen fuel storage module 582 or directly to dispenser 563 is facilitated by the various conduits forming supply line 574. In various embodiments, the length of the conduits from heat exchanger 580 to dispenser 563 is preferably less than sixty meters to be able to maintain the temperature of the hydrogen during a fueling operation at a desired level. The flow of hydrogen is controlled by station control module 512; however, additional controllers dedicated to controlling one or more compressors 581 or dispenser 563 may also be used. The controller(s) control hydrogen flow via one or more valves 586, based at least in part on values of pressure and temperature measured at the various components comprising system 500, including, for example, at the plurality of storage tanks 583, one or more compressors 581, heat exchanger 580 and dispenser 563.

In various exemplary embodiments, system 500 includes dispenser 563 (internal or external) as the only dispenser. In various embodiments, however, additional dispensers are desirable or advantageous. Accordingly, in various embodiments, system 500 may be configured with and/or retrofitted with a second dispenser 564. The connection of supply line 574 to second dispenser 564 may be made in a manner similar to the connection to dispenser 563. However, if second dispenser 564 is configured or intended to fuel vehicles having large vehicle tanks, such as, for example, a bus or a heavy duty truck (such as a class 8 truck), in accordance with principles of the present disclosure the connection may be accomplished using an auxiliary supply line 587, which is tapped into supply line 574 upstream of heat exchanger 580. In various embodiments, dispenser 563 may be configured similarly. Similar to dispenser 563, second dispenser 564 may include a second dispenser controller 573 and a second sensor 579 configured to monitor one or more of temperature, pressure and mass flow rate within or around second dispenser 564. A second data communication channel 517 is configured for transfer of data between second dispenser 564 and station control module 512.

Consistent with the foregoing embodiments, either or both of dispenser 563 and second dispenser 564 may operate under a safe communication channel, which may be installed with the dispensers or retrofitted after installation. In this manner, a station 506 may be retrofitted to be capable of determining a fueling protocol based on information received from a vehicle, e.g., the vehicle 502, according to an exemplary embodiment. According to an exemplary embodiment, safe communication is obtained by the bidirectional data exchange such that when the station control module 512 receives data from vehicle 502, the module will send the data back to vehicle 502, at which point vehicle 502 will verify that the data it received from the station control module 512 is the data initially sent. The vehicle will then send to station control module 512 either an "OK" signal if the data is the same or a "not OK" signal if the data is not the same. As mentioned, this may be accomplished, for example, via use of a PROFIsafe link between the dispenser 563 and/or second dispenser 564 and station control module 512, or other safe data communication protocols that are configured with inherent check and retransmit of data (if necessary) so that there is an appropriate level of certainty that data entering the safety channel is the same as the data exiting the data channel. One solution is to use a cable; hence, if the cable is not connected, the station control module 512 may determine that something is wrong and can act thereupon.

Figure 6:
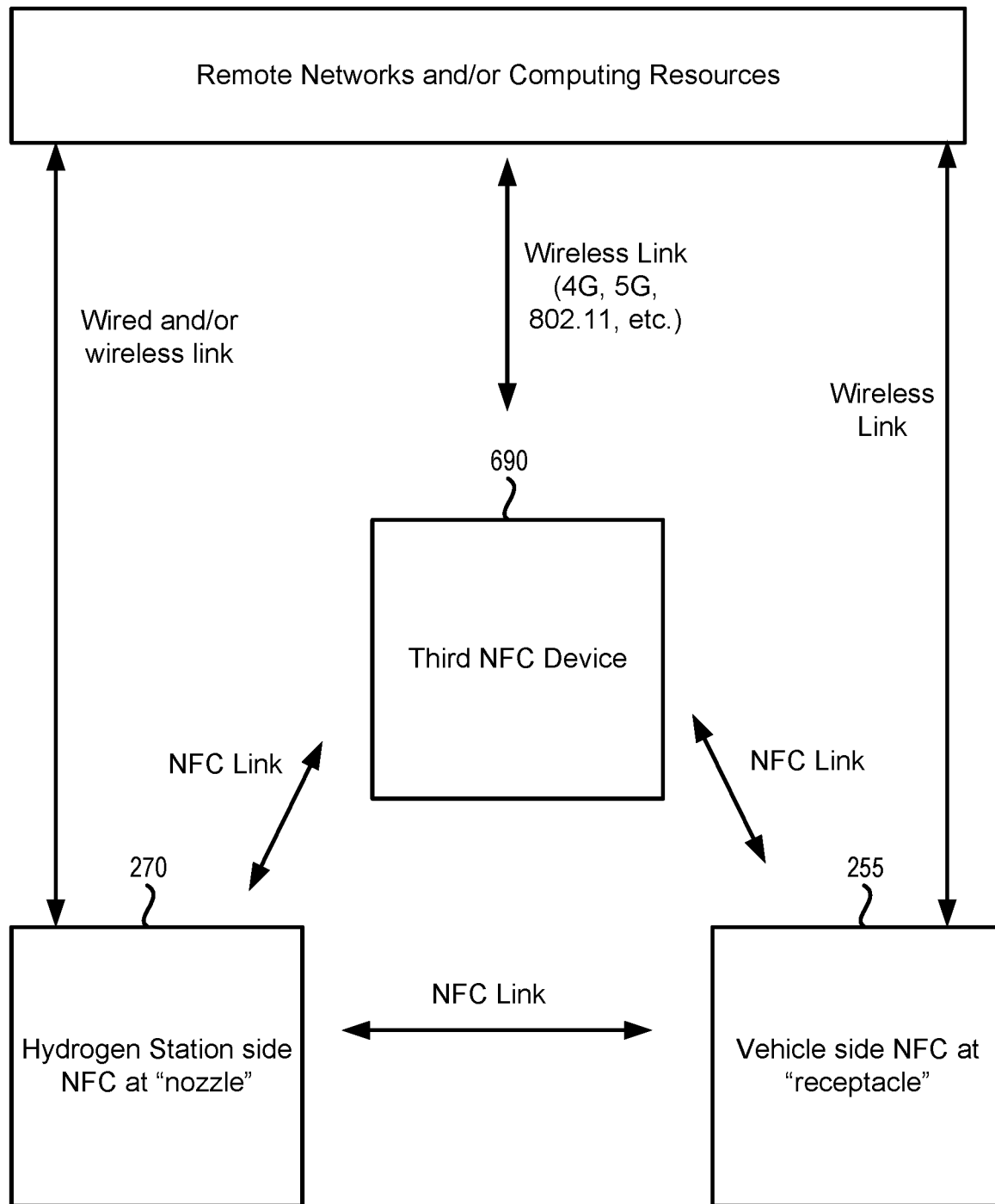
FIG. 6 illustrates NFC components utilized in connection with fueling operations, in accordance with various exemplary embodiments.

Turning now to FIG. 6, in various exemplary embodiments an exemplary system as disclosed herein may utilize a third NFC device 690, in addition to an NFC device in a vehicle and in a station, for example in order to provide additional capabilities, improve system security and/or performance, or the like. As used herein, a "third NFC device" refers to a device with NFC capabilities, with such device being neither part of a vehicle (e.g., vehicle 202) nor part of a station (e.g., station 206). For example, third NFC device 690 may comprise a smartphone of a vehicle driver, a tablet, a smartwatch, an access card, a mobile device of a station attendant, and/or the like. It will be appreciated that while such NFC device is referred to as a "third" NFC device 690, in various exemplary embodiments more than three NFC devices may be utilized in connection with a particular fueling protocol or other transaction or communication disclosed herein (for example, a particular fueling protocol and transaction may involve an NFC device on vehicle 202, an NFC device on station 206, an NFC device in a smartphone, and an NFC device in an access card). Additionally, it will be appreciated that, while communication among and between various NFC devices is contemplated, each device (e.g., hydrogen fueling station 206, vehicle 202, third NFC device 690) may also be in wired and/or wireless electronic communication with various other communication networks and/or computing resources, as shown. For example, third NFC device 690, in addition to NFC capabilities, may also utilize a 4G cellular connection to the internet or similar global data networks. Moreover, it will be appreciated that, while various embodiments may utilize three or more NFC-capable devices or components, such components are typically in 1:1 communication at any given time (i.e., third NFC device 690 may communicate with an NFC device of vehicle 202 during a given time, and at another time thereafter, third NFC device 690 may communicate with an NFC device of station 206, and at yet another time thereafter, an NFC device of vehicle 202 may communicate with an NFC device of station 206, and so forth).

Figure 7:
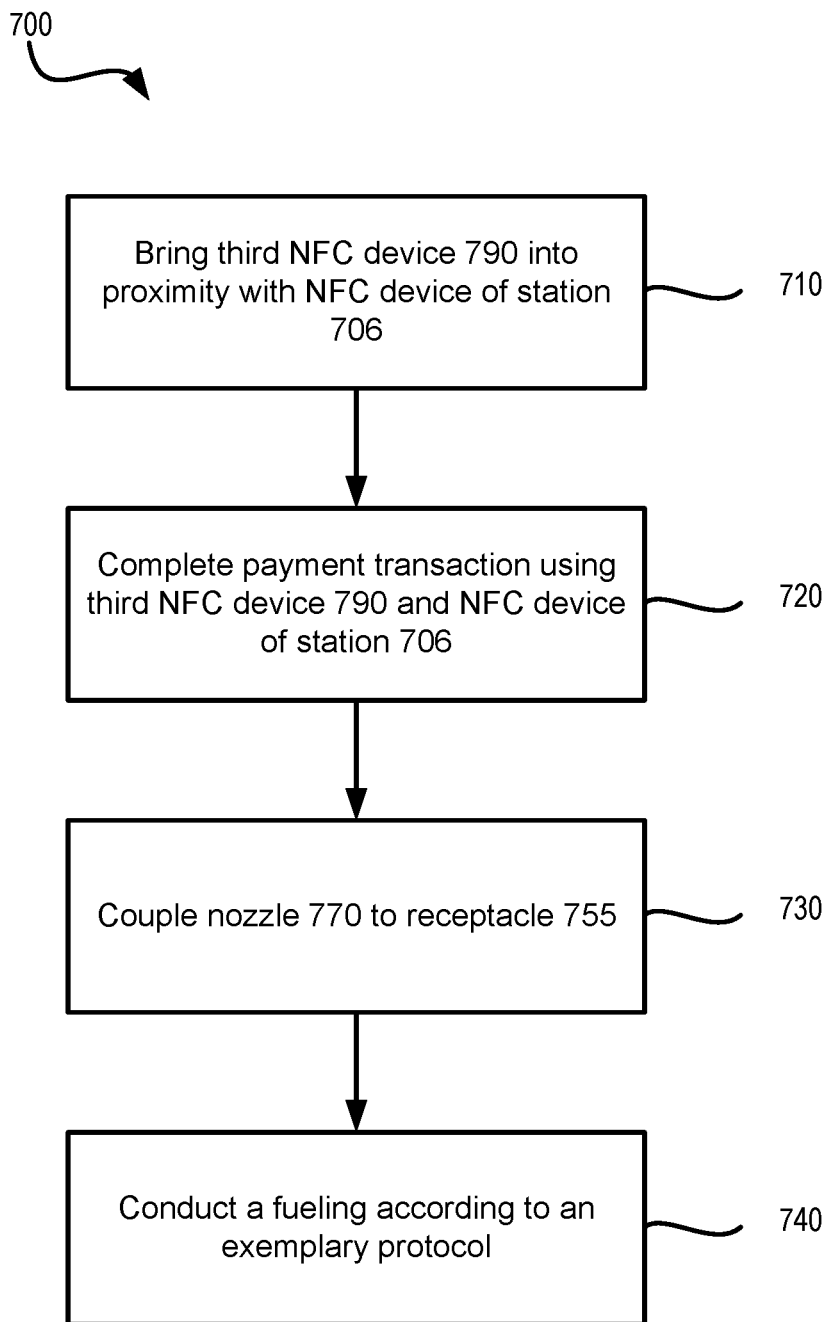
FIG. 7 illustrates a method for fueling a hydrogen vehicle in accordance with various exemplary embodiments.

In some exemplary embodiments, with reference now to FIG. 7, fueling of vehicle 702 (not shown) may be accomplished in connection with use of a third NFC device 790 comprising a mobile device such as a smartphone. An exemplary method 700 comprises bringing third NFC device 790 into proximity with an NFC device of a fueling station 706 (e.g., an NFC device disposed in or on nozzle 770) (step 710). A payment transaction is completed via communication between fueling station 706 and third NFC device 790, for example utilizing one or more existing or yet to be implemented payment protocols or systems such as Google Pay, Apple Pay, and/or the like (step 720). In various embodiments, the payment transaction may be for a desired mass of hydrogen (for example, 1 kilogram (kg), 2 kg, 10 kg, 20 kg, and/or the like), a desired state of charge (e.g., 50%, 60%, 80%, 100%, etc.), a desired percent of charge over a current percent of charge (for example, an additional 10%, 20%, 30%, 50%, etc.), a desired amount of additional range for vehicle 702, for example based on a modeled and/or measured rate of fuel or electrical charge utilized by vehicle 702 per unit distance (for example, 100 miles of additional range, 200 miles of additional range, 300 miles of additional range, etc.), and/or the like. Thereafter, nozzle 770 is coupled to receptacle 755 (step 730) and a fueling is conducted according to one or more fueling protocols as disclosed herein (step 740). It will be appreciated that in some alternative embodiments, in method 700 payment steps may be completed after fueling steps. Moreover, in some exemplary embodiments, payments steps of method 700 may also involve and/or utilize cellular or other wireless data connections of third NFC device 790 (for example, information regarding a proposed payment transaction may be transferred between a smartphone 790 and an NFC device of fueling station 706, but authorization and/or payment consummation may take place over a cellular connection of smartphone 790 and via an internet-connected payment processor).

Figure 8:
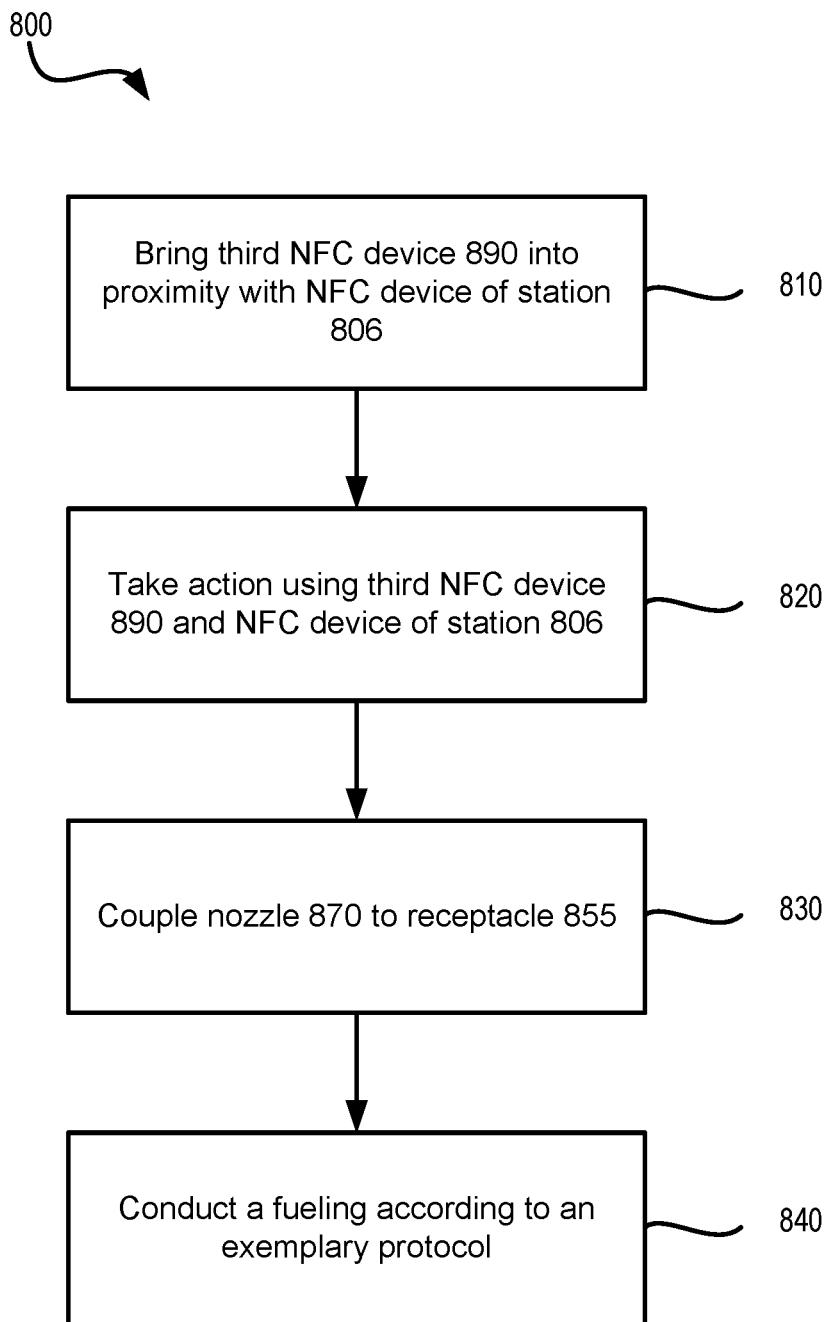
FIG. 8 illustrates a method for fueling a hydrogen vehicle in accordance with various exemplary embodiments.

In other exemplary embodiments, with reference to FIG. 8, fueling of vehicle 802 (not shown) may be accomplished in connection with use of a third NFC device 890 comprising an access chip or card. An exemplary method 800 comprises bringing third NFC device 890 into proximity with an NFC device of a fueling station 806 (e.g., an NFC device disposed in or on nozzle 870) (step 810). Based on one or more authentication or identification aspects of third NFC device 890, one or more transactions or actions may take place, for example: redeeming a voucher to at least partially pay for fueling of vehicle 802; activation of one or more features or capabilities of fueling station 806, such as infotainment resources, special pricing conditions, in-store offers at a retail establishment associated with or in physical proximity to fueling station 806, and/or the like; authentication or authorization for fueling of vehicle 802 to proceed (for example, ensuring a vehicle is fueled only by an authorized person is of heightened importance as vehicle and/or cargo value increases; in the event a vehicle is stolen, a thief would be unable to fuel the vehicle); service of fueling station 806 or an associated dispenser by an employee; and/or the like (step 820). Thereafter, nozzle 870 is coupled to receptacle 855 (step 830) and a fueling is conducted according to one or more fueling protocols as disclosed herein (step 840). It will be appreciated that in some alternative embodiments, in method 800 payment steps may be completed after fueling steps. Moreover, it will be appreciated that exemplary functions disclosed above associated with third NFC device 890 comprising an access chip or card may also be implemented when third NFC device 890 comprises a smartphone or other suitable computing device, for example when such device is operating utilizing a host card emulation or similar "virtual card" capability.

Figure 9:
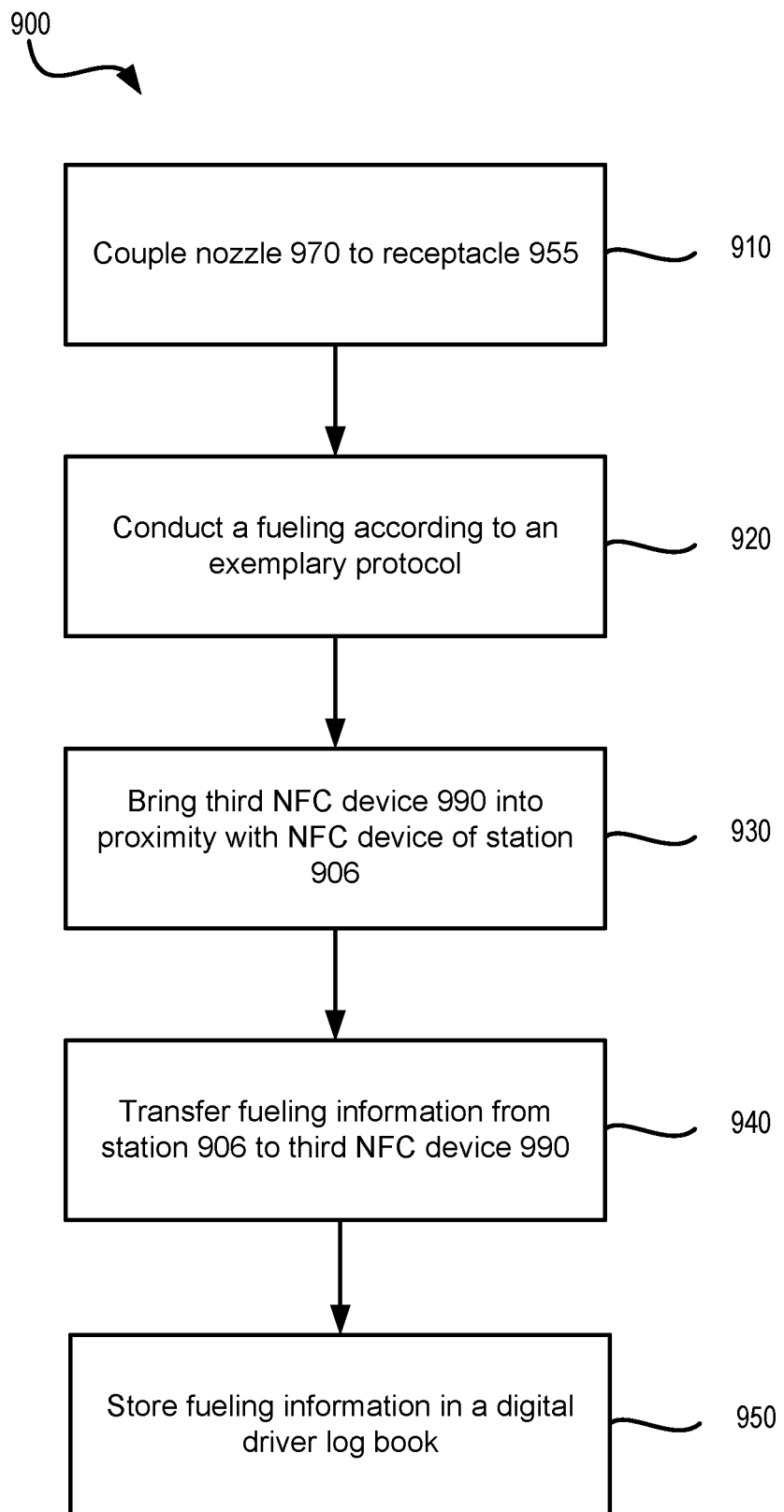
FIG. 9 illustrates a method for NFC communication associated with operation of a hydrogen vehicle in accordance with various exemplary embodiments.

In yet other exemplary embodiments, with reference to FIG. 9, fueling of vehicle 902 (not shown) may be accomplished in connection with use of a third NFC device 990 while simultaneously replacing or digitizing a driver log book or equivalent thereof. An exemplary method 900 comprises coupling nozzle 970 to receptacle 955 (step 910) and a fueling is conducted according to one or more fueling protocols as disclosed herein (step 920). Thereafter, third NFC device 990 (comprising a smartphone of a driver) is brought into proximity with an NFC device of fueling station 906 (e.g., an NFC device disposed in or on nozzle 970) (step 930). Information regarding the just-completed fueling (e.g., amount of hydrogen, price, location of fueling station 906, and so forth) is transferred via NFC between fueling station 906 and third NFC device 990 (step 940). Third NFC device 990 may store this information in a database configured as a driver log book; alternatively, third NFC device 990 may transmit this information to a remote system where a database configured as a driver log book is stored (step 950), for example to a cloud-based driver log book service, a centralized computing system of an owner of vehicle 902, and/or the like. In this manner, conventional driver log books may be eliminated and/or made digital. It will be appreciated that in some exemplary embodiments, third NFC device 990 may receive information from fueling station 906 via a method other than NFC, for example via a Wi-Fi connection, via capture of a bar code, QR code, or similar visual data technique displayed on a display of station 906, and/or the like.

Principles of the present disclosure may be set forth in the following example sets, each of which are presented by way of explanation and not of limitation.

Example Set A

Example 1

A method for fueling a hydrogen vehicle using near field communication (NFC), the method comprising: providing a first NFC device associated with the hydrogen vehicle, a second NFC device associated with a hydrogen fueling station, and a third NFC device associated with an operator of the hydrogen vehicle; bringing the third NFC device into proximity with the second NFC device to establish a first NFC link therebetween; conducting, using information transmitted via the first NFC link, a payment transaction for fuel for the hydrogen vehicle; coupling a nozzle of the fueling station to a receptacle of the hydrogen vehicle to bring the first NFC device and the second NFC device into proximity to establish a second NFC link therebetween; and conducting a fueling of the hydrogen vehicle pursuant to the payment transaction and utilizing information transmitted over the second NFC link.

Example 2

The method of Example 1, wherein the conducting a fueling is performed utilizing information transmitted over a vehicle to infrastructure (V2X) link between the hydrogen vehicle and the hydrogen fueling station.

Example Set B

Example 1

A method for fueling a hydrogen vehicle using near field communication (NFC), the method comprising: providing a first NFC device associated with the hydrogen vehicle, a second NFC device associated with a hydrogen fueling station, and a third NFC device associated with an operator of the hydrogen vehicle; bringing the third NFC device into proximity with the second NFC device to establish a first NFC link therebetween; conducting, using information transmitted via the first NFC link, a data transaction associated with the hydrogen vehicle; coupling a nozzle of the fueling station to a receptacle of the hydrogen vehicle to bring the first NFC device and the second NFC device into proximity to establish a second NFC link therebetween; and conducting a fueling of the hydrogen vehicle pursuant to the data transaction.

Example 2

The method of Example 1, wherein the data transaction comprises at least one of: redeeming a voucher to at least partially pay for fueling of the hydrogen vehicle; activation of one or more features or capabilities of the hydrogen fueling station, such as infotainment resources, special pricing conditions, in-store offers at a retail establishment associated with or in physical proximity to the hydrogen fueling station; authentication or authorization for fueling of the hydrogen vehicle to proceed; or service of the hydrogen fueling station or an associated hydrogen dispenser by an employee.

Example 3

The method of any of Examples 1-2, wherein the conducting a fueling is performed utilizing information transmitted over a vehicle to infrastructure (V2X) link between the hydrogen vehicle and the hydrogen fueling station.

Example Set C

Example 1

A method for fueling a hydrogen vehicle using near field communication (NFC), the method comprising: providing a first NFC device associated with the hydrogen vehicle, a second NFC device associated with a hydrogen fueling station, and a third NFC device associated with an operator of the hydrogen vehicle; coupling a nozzle of the fueling station to a receptacle of the hydrogen vehicle to bring the first NFC device and the second NFC device into proximity to establish a first NFC link therebetween; conducting a fueling of the hydrogen vehicle utilizing information transmitted over the first NFC link; bringing the third NFC device into proximity with the second NFC device to establish a second NFC link therebetween; transmitting, to the third NFC device and over the second NFC link, information regarding the fueling; and transmitting, by the third NFC device and via a cellular network connection, the fueling information to a remote system where a database configured as a driver log book is stored.

Example 2

The method of Example 1, wherein the fueling information comprises information regarding an amount of hydrogen transferred to the hydrogen vehicle, a transaction price, and a physical location of the fueling station.

Example 3

The method of any of Examples 1-2, wherein the conducting a fueling is performed utilizing information transmitted over a vehicle to infrastructure (V2X) link between the hydrogen vehicle and the hydrogen fueling station.

Example Set D

Example 1

A method for communication between a charging station and an electric vehicle, the method comprising: disposing a charging cable of the station within a specified distance of a receptacle on the vehicle to establish, via first near field communication (NFC) hardware disposed on the cable and second NFC hardware disposed proximate the receptacle, an NFC link therebetween; communicating to the charging station, via the NFC link, identifying information for the vehicle; selecting, by the charging station, a vehicle to infrastructure (V2X) communication network based on the identifying information for the vehicle; establishing, between the charging station and the vehicle, a V2X communication link via the V2X communication network; and delivering through the charging cable, by the charging station and to the vehicle via the receptacle, electrical current to at least partially charge a battery of the electric vehicle.

Example 2

The method of Example 1, further comprising monitoring, during the delivering electrical current and via the V2X link or the NFC link, one or more status indicators for the battery of the electric vehicle.

Example 3

The method of any of Examples 1-2, further comprising stopping, by the charging station, delivery of electrical current to the electric vehicle in response to an indication that a vehicle battery condition is out of bounds.

Example 4

The method of any of Examples 1-3, further comprising transmitting to the electric vehicle, by the charging station and over the V2X communication link, an update to at least one of: a software application operative on the electric vehicle; or firmware for an electronic device operative as part of the electric vehicle.

Example 5

The method of any of Examples 1-4, further comprising exchanging, between the charging station and the electric vehicle and over the V2X communication link, payment information and confirmation associated with the delivering the electrical current to the electric vehicle.

Example 6

The method of any of Examples 1-5, further comprising downloading from the electric vehicle, to the charging station and over the V2X communication link, diagnostic information for a component of the electric vehicle.

Example 7

The method of any of Examples 1-6, wherein a communication protocol of the V2X communication link is at least one of an IEEE 802.11 protocol, a 4G LTE mobile network protocol, or a 5G mobile network protocol.

Example 8

The method of any of Examples 1-7, wherein the specified distance is 20 centimeters or less.

Principles of the present disclosure may be utilized in connection with various electric vehicles and/or fuel cell electric vehicles, for example as disclosed in (i) U.S. Pat. No. 10,077,084 entitled SYSTEMS, METHODS, AND DEVICES FOR AN AUTOMOBILE DOOR OR WINDOW, (ii) U.S Patent Application Publication No. 2019-0263455 entitled SYSTEMS, METHODS, AND DEVICES FOR AN AUTOMOBILE DOOR OR WINDOW, and/or (iii) U.S. Pat. No. 10,308,132 entitled ELECTRIC UTILITY TERRAIN VEHICLE. The contents of each of the foregoing are hereby incorporated in their entirety for all purposes (except for any subject matter disclaimers or disavowals, and except to the extent of any conflict with the disclosure of the present application, in which case the disclosure of the present application shall control).

Vehicle communication systems in accordance with the principles of the present disclosure may be configured with any suitable components, structures or elements in order to provide desired functional, communicative, electrical or other related properties. In particular, referring now to the foregoing figures and accompanying disclosure, the process flows and techniques depicted are merely embodiments and are not intended to limit the scope of the disclosure. For example, the steps recited in any of the method or process descriptions may be executed in any suitable order and are not limited to the specific order presented. It will be appreciated that the description makes appropriate references not only to the steps and user interface elements depicted in the figures, but also to the various system components described above. It should be understood at the outset that, although exemplary embodiments are illustrated in the figures and described herein, the principles of the present disclosure may be implemented using any number of suitable techniques and components, whether or not currently known. The present disclosure should, therefore, not be limited to the exemplary implementations and techniques illustrated in the figures and described herein. Unless otherwise specifically noted, components depicted in the figures are not necessarily drawn to scale.

Computer programs (also referred to as computer control logic) may be stored in main memory or secondary memory. Computer programs may also be received via a communication interface. Such computer programs, when executed, enable the computer system to perform the features as discussed herein. In particular, the computer programs, when executed, enable the processor to perform the features of various embodiments. Accordingly, such computer programs represent controllers of the computer system. These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, flash memory, or communication interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, certain systems disclosed herein, or components thereof, may be embodied as a customization of an existing system, an add-on product, a processing apparatus executing upgraded software, a stand-alone system, a distributed system, a method, a data processing system, a device for data processing, or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, integrated circuit storage devices, optical storage devices, magnetic storage devices, or the like.

In various embodiments, components, modules, or engines of an exemplary system may be implemented as micro-applications or micro-apps. Micro-apps are typically deployed in the context of a mobile operating system, including for example, a Windows mobile operating system, an Android operating system, an Apple iOS operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Systems and methods may be described herein in terms of functional block components, screen shots, optional selections, and various processing steps. It should be appreciated that such functional blocks may be realized by any number of hardware or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, JavaScript Object Notation (JSON), VBScript, assembly, perl, php, awk, python, extensible markup language (XML), or the like with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Exemplary systems and methods may be described herein with reference to screen shots, block diagrams and flowchart illustrations of methods, apparatus, and computer program products according to various embodiments. It will be understood that certain functional blocks of the block diagrams and the flowchart illustrations, and combinations of functional blocks in the block diagrams and flowchart illustrations, respectively, can be implemented by computer program instructions. Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user applications, webpages, websites, web forms, prompts, etc. Practitioners will appreciate that the illustrated steps described herein may comprise any number of configurations including the use of applications, webpages, web forms, popup applications, prompts, and the like. It should be further appreciated that the multiple steps as illustrated and described may be combined into single webpages or applications but have been expanded for the sake of simplicity. In other cases, steps illustrated and described as single process steps may be separated into multiple webpages or applications but have been combined for simplicity.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles (for example, a hydrogen tank from a less-full state to a more-full state, a battery from a lower state of charge to a higher state of charge, and so forth).

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; or like data useful in the operation of the system. As those skilled in the art will appreciate, user computer may include an operating system as well as various conventional support software and drivers typically associated with computers.

The present system or certain part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communication bus, cross-over bar, network, etc.). Various software embodiments are described in terms of this exemplary computer system. After reading this description, it will become apparent to a person skilled in the relevant art(s) how to implement various embodiments using other computer systems or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, or a removable storage drive. The removable storage drive reads from or writes to a removable storage unit in a well-known manner. As will be appreciated, the removable storage unit includes a computer usable storage medium having stored therein computer software or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as flash memory, hard drives, and the like. These computer program products provide software to a computer system. The computer system may also include a communication interface. A communication interface allows software and data to be transferred between the computer system and external devices. Examples of communication interface may include a modem, a network interface (such as an Ethernet card), a communication port, a Personal Computer Memory Card International Association (PCMCIA) slot and card, etc. Software and data transferred via the communication interface are in the form of signals which may be electronic, electromagnetic, optical, or other signals capable of being received by a communication interface. These signals are provided to the communication interface via a communication path (e.g., a channel). This channel carries signals and may be implemented using wire, cable, fiber optics, a telephone line, a radio frequency (RF) link, wireless and other suitable communication channels.

Any databases discussed herein may include relational, hierarchical, graphical, blockchain, object-oriented structure, or any other database configurations. Additionally, transactions and/or data exchanges disclosed herein may utilize blockchain, distributed ledger, and/or similar approaches, for example for verification, validation, and/or data integrity purposes. Moreover, any database may also include a flat file structure wherein data may be stored in a single file in the form of rows and columns, with no structure for indexing and no structural relationships between records. For example, a flat file structure may include a delimited text file, a CSV (comma-separated values) file, or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, or the like. The association step may be accomplished by a database merge function, for example, using a "key field" in preselected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first or second party. Each of these three exemplary data sets may contain different information that is stored using different data storage formats or techniques. Further, each data set may contain subsets of data that also may be distinct from other subsets.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value. Yet further, as used herein, the term "proximate", "proximity", or the like may refer to a distance between objects being 20 centimeters or less, or 15 centimeters or less, or 10 centimeters or less, or 5 centimeters or less.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for communication between a charging station and an electric vehicle, the method comprising:
    disposing a charging cable of the station within a specified distance of a receptacle on the vehicle to establish, via first near field communication (NFC) hardware disposed proximate the nozzle and second NFC hardware disposed proximate the receptacle, an NFC link therebetween;
    communicating to the station, via the NFC link, identifying information for the vehicle;
    selecting, by the station and after establishing the NFC link, a vehicle to infrastructure (V2X) communication network based on the identifying information for the vehicle;
    establishing, between the station and the vehicle, a V2X communication link via the V2X communication network;
    delivering through the charging cable, by the station and to the vehicle via the receptacle, electrical current to at least partially charge an electric vehicle battery; and
    monitoring, via the V2X communication network and during the delivering electric current, one or more status indicators for the electric vehicle battery.

2. The method of claim 1, further comprising stopping, by the station, delivery of electric current to the vehicle in response to an indication that a vehicle battery condition is out of bounds.

3. The method of claim 1, further comprising communicating, via the NFC link, one or more of: a charging protocol identifier; a vehicle identification number, battery capacity, battery type, receptacle type, a charging command, a measured temperature for the electric vehicle battery, a measured voltage for the electric vehicle battery, a maximum current between the charging cable and the receptacle, or a watchdog counter.

4. The method of claim 1, further comprising transmitting to the vehicle, by the station and over the V2X communication link, an update to at least one of: a software application operative on the vehicle; or firmware for an electronic device operative as part of the vehicle.

5. The method of claim 1, further comprising exchanging, between the station and the vehicle and over the V2X communication link, payment information and confirmation associated with the delivering the electric current to the vehicle.

6. The method of claim 1, further comprising downloading from the vehicle, to the station and over the V2X communication link, diagnostic information for a component of the vehicle.

7. The method of claim 1, further comprising, responsive to an interruption in communication over one of the V2X communication link or the NFC link, completing delivery of electric current the charging cable in accordance with a default charging protocol associated with the electric vehicle battery.

8. The method of claim 1, further comprising updating, responsive to the monitoring and in a database accessible to the station, at least one characteristic of a default charging protocol for the vehicle.

9. The method of claim 1, wherein a communication protocol of the V2X communication link comprises at least one of an IEEE 802.11 protocol, a 4G LTE mobile network protocol, or a 5G mobile network protocol.

10. The method of claim 1, wherein the first NFC hardware is replaceable without impairing the electric current delivery function of the charging cable.

11. The method of claim 1, wherein the specified distance is 20 centimeters or less.

12. The method of claim 1, wherein the charging station is also a hydrogen fueling station, wherein the electric vehicle is also a hydrogen powered vehicle, and wherein the method further comprises:
    disposing a nozzle of the station within a specified distance of a receptacle on the vehicle to establish, via third NFC hardware disposed proximate the nozzle and fourth NFC hardware disposed proximate the receptacle, a second NFC link therebetween; and
    delivering through the nozzle, by the station and to the vehicle via the receptacle, pressurized hydrogen to at least partially fill a vehicle hydrogen tank.

13. The method of claim 12, further comprising monitoring, during the delivering pressurized hydrogen and via the second NFC link, one or more status indicators for the vehicle hydrogen tank.

14. The method of claim 1, further comprising bringing a third NFC device associated with an operator of the vehicle into proximity with fourth NFC hardware disposed on the charging station to establish a second NFC link therebetween.

15. The method of claim 14, further comprising conducting, using information transmitted via the second NFC link, a payment transaction for charging the vehicle.

16. The method of claim 14, further comprising conducting, using information transmitted via the second NFC link, a data transaction associated with the vehicle.

17. The method of claim 16, wherein the data transaction comprises at least one of: redeeming a voucher to at least partially pay for charging of the vehicle; activation of one or more features or capabilities of the charging station, such as infotainment resources, special pricing conditions, or in-store offers at a retail establishment associated with or in physical proximity to the charging station; authentication or authorization for charging of the vehicle to proceed; or service of the charging station by an employee.

* * * * *